United States Patent
Schulz et al.

(10) Patent No.: US 11,542,635 B2
(45) Date of Patent: Jan. 3, 2023

(54) CARBON NANOTUBE HYBRID MATERIAL FABRIC, COMPOSITE FABRIC, AND PERSONAL PROTECTIVE APPAREL AND EQUIPMENT

(71) Applicant: University of Cincinnati, Cincinnati, OH (US)

(72) Inventors: Mark J. Schulz, West Chester, OH (US); Sathya Kanakaraj, Cincinnati, OH (US); David Mast, Cincinnati, OH (US); Vesselin Shanov, Cincinnati, OH (US); Devika Chauhan, Cincinnati, OH (US); Guangfeng Hou, Perrysburg, OH (US); Vianessa Ng, Miami, FL (US); Chenhao Xu, Lakeside Park, KY (US); Rui Daniel Chen, Cincinnati, OH (US); Ashley Kubley, Cincinnati, OH (US); Xiaoda Hou, Fruitland Park, FL (US); Richard Kleismit, Cincinnati, OH (US); Zhangzhang Yin, Monroeville, PA (US)

(73) Assignee: UNIVERSITY OF CINCINNATI, Cincinnati, OH (US)

(*) Notice: Subject to any disclaimer, the term of this patent is extended or adjusted under 35 U.S.C. 154(b) by 28 days.

(21) Appl. No.: 16/629,714

(22) PCT Filed: Jul. 10, 2018

(86) PCT No.: PCT/US2018/041426
§ 371 (c)(1),
(2) Date: Jan. 9, 2020

(87) PCT Pub. No.: WO2019/014212
PCT Pub. Date: Jan. 17, 2019

(65) Prior Publication Data
US 2020/0270774 A1    Aug. 27, 2020

Related U.S. Application Data

(60) Provisional application No. 62/639,135, filed on Mar. 6, 2018, provisional application No. 62/530,486, filed on Jul. 10, 2017.

(51) Int. Cl.
*D01F 9/127* (2006.01)
*D02G 3/04* (2006.01)
(Continued)

(52) U.S. Cl.
CPC .............. *D01F 9/127* (2013.01); *D02G 3/047* (2013.01); *D02G 3/40* (2013.01); *D02G 3/441* (2013.01); *B82Y 30/00* (2013.01); *B82Y 40/00* (2013.01)

(58) Field of Classification Search
CPC .......... D01F 9/127; D01F 9/12; D01F 9/1271; D01F 9/1272; D01F 9/1273;
(Continued)

(56) References Cited

U.S. PATENT DOCUMENTS

| 8,545,963 B2 | 10/2013 | Alberding et al. |
| 2008/0170982 A1* | 7/2008 | Zhang .................. D01F 9/1273 |
| | | 423/447.3 |

(Continued)

FOREIGN PATENT DOCUMENTS

| CN | 1789120 A | 6/2006 |
| CN | 203986257 U | 12/2014 |

(Continued)

OTHER PUBLICATIONS

Su, Multi-Field Physiucs for the Synthesis of Carbon Nanotube Yarn and Sheet, Thesis, accessed online at https://etd.ohiolink.edu/apexprod/rws_etd/send_file/send?accession=ucin1439310862&disposition=inline (Jun. 15, 2015) (Year: 2015).*

(Continued)

*Primary Examiner* — Daniel C. McCracken
(74) *Attorney, Agent, or Firm* — Dinsmore & Shohl LLP

(57) ABSTRACT

Carbon nanotube (CNT) fiber and sheets formed by a specialized gas assembly pyrolytic reactor method that permits gas phase integration of nano and micro particles (NMPs) are processed into yarn and fabric used in the manufacture of personal protective clothing and equipment that can be tailored via selection of NMPs for a wide variety (Continued)

Micro-Processor and Battery are located remotely of functionality depending on target application. The CNT-NMP hybrid fabrics may be designed to exhibit enhanced electrical and thermal conductivity, moisture wicking, air filtering, and environmental sensing properties.

9 Claims, 24 Drawing Sheets

(51) Int. Cl.
*D02G 3/40* (2006.01)
*D02G 3/44* (2006.01)
*B82Y 30/00* (2011.01)
*B82Y 40/00* (2011.01)

(58) Field of Classification Search
CPC .... D01F 9/1274; D01F 9/1275; D01F 9/1276; D01F 9/1277; D01F 9/1278; D01F 9/133; D02G 3/047; D02G 3/40; D02G 3/441; B82Y 30/00; B82Y 40/00; C01B 2202/08; C01B 32/15; C01B 32/16; C01B 32/168; C01B 32/158; C01B 32/159; C01B 32/162; C01B 32/164; C01B 32/166; C01B 32/17; C01B 32/172; C01B 32/174; C01B 32/176; C01B 32/178; C01B 2202/00; C01B 2202/02; C01B 2202/04; C01B 2202/06; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36

See application file for complete search history.

(56) References Cited

U.S. PATENT DOCUMENTS

| | | |
|---|---|---|
| 2011/0071454 A1 | 7/2011 | Hitoe et al. |
| 2011/0171469 A1 | 7/2011 | Shah et al. |
| 2013/0200309 A1* | 8/2013 | Song .................... B29C 70/025 252/502 |
| 2016/0024262 A1* | 1/2016 | Lu ........................ B29C 70/021 523/222 |

FOREIGN PATENT DOCUMENTS

| | | |
|---|---|---|
| CN | 196136383 A | 11/2016 |
| KR | 101703516 B1 | 2/2017 |
| WO | 2006010521 | 2/2006 |
| WO | 2014197078 | 12/2014 |

OTHER PUBLICATIONS van der Werff, et al., Tensile deformation of high strength and high modulus polyethylene fibers, Colloid. Polym. Sci. 1991; 269: 747-763 (Year: 1991).*
Zhang, et al., Metallic conductivity transition of carbon nanotube yarns coated with silver particles, Nanotechnology 2014; 25: 275702, pp. 1-7 (Year: 2014).*
"What is Kevlar," accessed online at https://web.archive.org/web/20070320005408/http://www.dupont.com/kevlar/whatiskevlar.html (Year: 2006).*
Kevlar®, accessed online at https://www.explainthatstuff.com/kevlar.html on Jul. 30, 2022. (Year: 2022).*
Elastomer, accessed online at https://www.britannica.com/science/elastomer on Jul. 30, 2022. (Year: 2022).*
See Fire-Resistant Elastomers DOT/FAA/AR-TN01/104 (May 2002), accessed online at https://www.fire.tc.faa.gov/pdf/TN-01-104.pdf on Jul. 30, 2022. (Year: 2002).*
Machine Translation of KR 101,703,516 B1; Feb. 7, 2017.
Schulz, Mark J. et al. Science to Commercialization of Carbon Nanotube Sheet an Yarn, Wsease Transactions, Applied and Theoretical Mechanics, vol. 12, Jan. 1, 2017, pp. 41, 43-45.
Gonzales, F. J. et al, Comparison of dipole, bowtie, spiral and log-periodic IR antennas; Infrared Physics & Technology, vol. 46, No. 5, Jun. 1, 2005; pp. 418-428.
Machine Translation of CN 1,789,120 A; Jun. 21, 2006.
Machine Translation of CN 203,986,257 U; Dec. 10, 2014.
Machine Translation of CN 106,136,383 A; Nov. 23, 2016.

* cited by examiner

CNT Sheet, time=0 minutes

Time=5 min

Time=10 min

Adhesive Sample 4: Stitch Witchery Polyamide Fusible Web bonded to sample fabric substrates with CNT sheet.

Adhesive Sample 5: Fusible tricot nylon stay tape bonded to sample fabric substrates with CNT sheet.

Adhesive Sample 6: Sobo Fabric Glue

Adhesive Sample 7: Loctite Cement

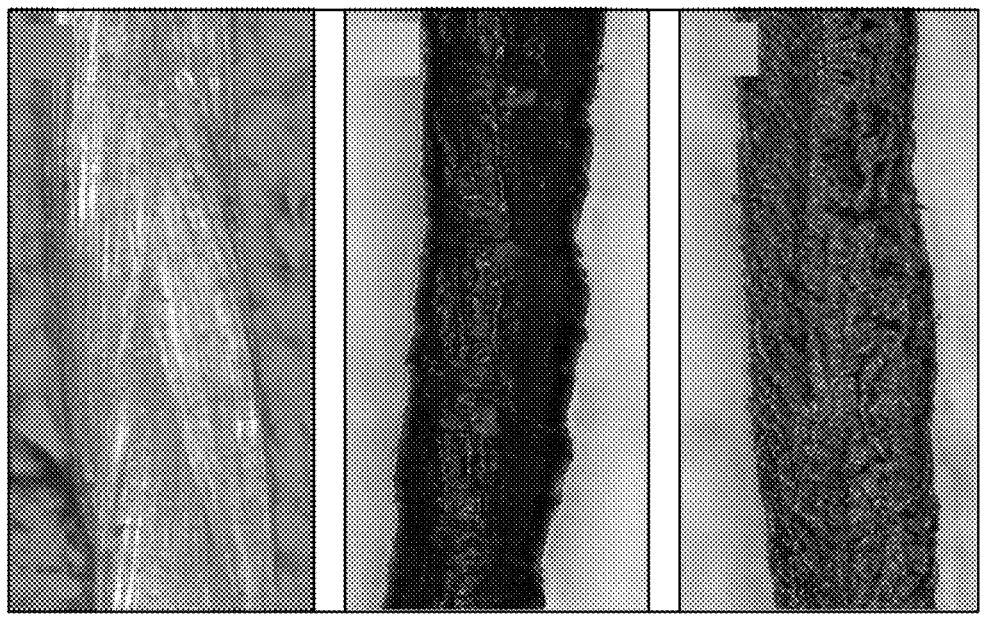
FIG. 16A   FIG. 16B   FIG. 16C
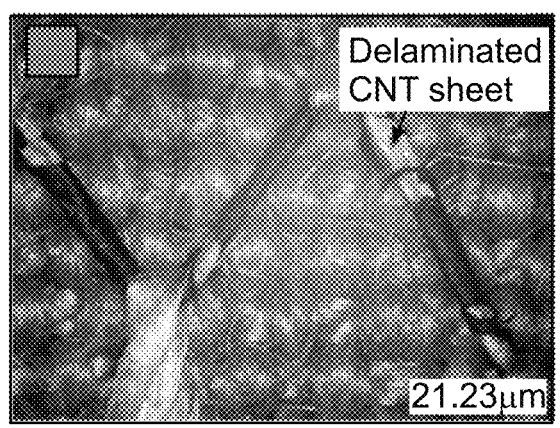
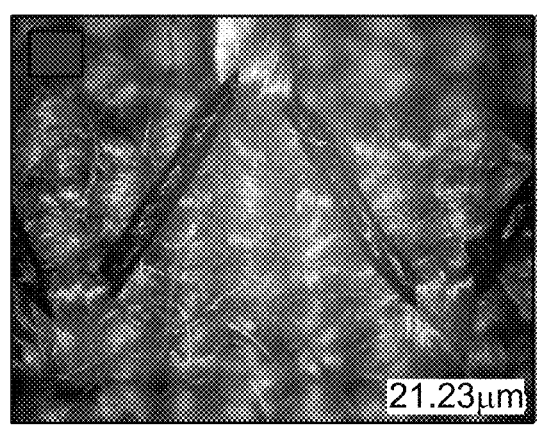
FIG. 17A   FIG. 17B

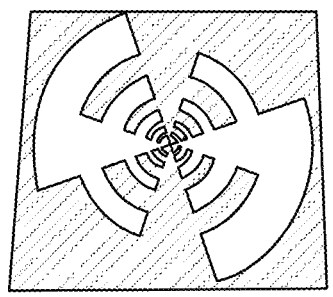
FIG. 19C
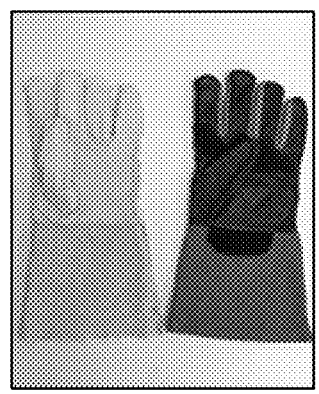 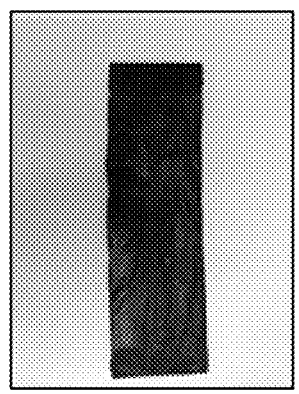
FIG. 20A  FIG. 20B
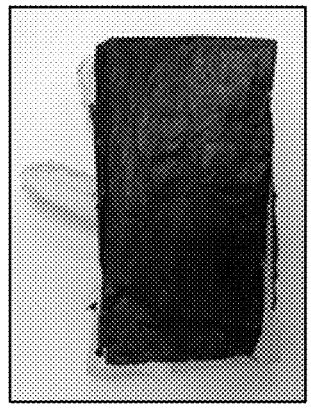 
FIG. 20C  FIG. 20D

CARBON NANOTUBE HYBRID MATERIAL FABRIC, COMPOSITE FABRIC, AND PERSONAL PROTECTIVE APPAREL AND EQUIPMENT

PRIORITY CLAIM

This application is a national stage application under 35 U.S.C. § 371 of International Application No. PCT/US2018/041426, filed Jul. 10, 2018, and claims priority to U.S. Provisional application Ser. Nos. 62/530,486 filed on Jul. 10, 2017, and 62/639,135 filed on Mar. 6, 2018, the entire disclosures of which are incorporated herein.

GOVERNMENT RIGHTS

This invention was made with government support under contract no. EEC-0812348 awarded by the National Science Foundation, contract no. N00014-15-1-27-73 awarded by the Office of Naval Research, contract no. W911NF-12-2-0026 awarded by the Army Research Laboratory, and contract no. T420H008423 awarded by the National Institutes of Health. The government has certain rights in the invention.

BACKGROUND

In 2014, eighty-seven firefighters died in the line of duty in the US, and 63% of those fatalities were from heat-related complications. Ninety firefighters died on-duty in 2015, and the numbers continue to rise (FEMA U.S. Fire Administration Reports). Further, due to evidence of greater than expected rates of cancer, the National Institute for Occupational Safety and Health (NIOSH) undertook a five year study of nearly 30,000 firefighters from the Chicago, Philadelphia, and San Francisco Fire Departments between the years 2010 and 2015 and found that: (i) firefighters had a higher rate of cancer-related deaths from digestive, oral, respiratory, and urinary cancers than controls; (ii) firefighters suffered from malignant mesothelioma, a rare type of cancer caused by exposure to asbestos, at significantly higher rates; and (iii) bladder and prostate cancer was diagnosed at a much younger age in firefighters than in the general population.

Specialized fibers and fabrics developed to protect firefighters and other high-risk/exposure groups such as military combatants and high-altitude pilots from excess heat entered the market more than 40 years ago (Kevlar®/Nomex™). However, while these "traditional" specialized protective fabrics provided considerable improvement, they were designed to be thermally insulating and are therefore relatively non-thermally conductive; the materials cannot dissipate heat as a cooling mechanism. Thus traditional protective fibers remain deficient in two key material properties for determining suitability for firefighter garments—Thermal Protection Performance (TPP), which is the flame and radiant heat test before pain and $2^{nd}$ degree burns, and Total Heat Loss (THL), which reflects the ability of fire fighter turnout gear to remove user core heat through conduction or evaporation.

Carbon nanotubes (CNT's) are a relatively new material. Studies indicate that using carbon nanotubes (CNTs) as a fire retardant material might extend the operational time of an article in a fire almost two-fold. Thus research and development of CNT fabrics for protective gear has intensified. Most of the published methods use CNTs dispersed in a matrix having a loading of a few weight percent. For example, Janas et al. (*Flame-retardant carbon nanotube films*, Applied Surface Science, 411, 177 March 2017), discloses a CNT layer used as a fire retardant material with the CNT sheet formed using powdered CNT sprayed onto a base fabric. Nonetheless, the composite fabric was more effective in stopping fire from spreading than Nomex™, Twaron™, and Kevlar® alone. However, the sprayed-on CNT fabrics were not satisfactory for use in responder apparel because the CNT skin did not survive laundering and or ordinary wear conditions.

CNT yarns and sheets formed by a free-floating catalyst method in a pyrolytic reactor are also known, however the CNT sheets produced in these protocols have not been strong or flexible enough for consideration as protective fabrics, and generally have a higher than acceptable load of impurities. Further, the CNT produced is not capable of conferring functionality to the fabric not imparted solely by CNT.

More recently, the present investigators developed a novel method for integrating particles directly into CNT materials during a gas phase synthesis process with the resulting CNT sock/sheet exhibiting high load, as the particles could be incorporated throughout the material and not just on the surface (see PCT/US18/19427, the entire disclosure of which is incorporated herein). This discovery opened the door to the development of CNT materials designed with specific target functionality based on properties of the incorporated particle. If a garment could be designed both to resist flames and to filter toxic chemicals and particles from the environment, it could not only reduce heat-stress-related fatalities, but could also reduce the incidence of longer term health problems experienced by fire fighters as a result of exposure to toxic airborne chemicals.

Clearly, there remains a compelling need in the art for improved protective fabrics, articles and garments that reduce heat stress and confer additional functionality such as filtering toxic gases and particles from an extreme environmental condition such as that imposed by a structural or wilderness fire.

SUMMARY

Accordingly, embodiments of the invention provide novel CNT-hybrid (CNTH) materials comprising carbon nanotubes (CNTs) and nano or microparticles (NMPs) integrated together in a continuous synthesis process to form continuous yarn and sheet materials that have designed-in properties for targeted applications. CNTH fabric, which is highly thermally conductive in the plane of the fabric, can be tailored to have low thermal conductivity normal to the plane, is an ideal material for improving fire fighter apparel. CNTH fabric properties exceed those of pristine CNT yarn and sheet materials formed using other manufacturing methods because the novel synthetic process provides greater control over the nanotube growth and the incorporated NMPs provide a variety of functionality over carbon nanotubes alone. Garments made with CNTH are capable of spreading user metabolic heat to increase cooling by increasing evaporation of sweat, can filter some toxic airborne chemicals, and wick heat to cooler areas of the garment or to heat sinks in the garment. The novel fabrics are also lighter and more compliant than traditional protective fabrics.

One embodiment is directed to a yarn or fabric comprising a carbon nanotube hybrid (CNTH) material, wherein the CNTH material is synthesized by gas phase assembly and exhibits a degree of tubular alignment. A CNTH material may comprise a carbon nanotube (CNT) sheet integrated with at least one particle type selected from Cu, Ag, Ag/Cu alloy, granulated activated carbon (GAC), ferrocene, Si, Alumina, Co/Fe alloy, diamond, $TiO_2$, carbon fiber, carbon particulate, powdered high modulus polyethylene (HMPE), and combinations thereof.

Another embodiment is directed to a composited material comprising a yarn or fabric comprising a CNTH and at least one other natural or synthetic fiber.

Another embodiment is directed to an article of personal protective equipment (PPE) comprising a yarn or fabric or composited material comprising CNTH material.

Another embodiment is directed to a glove exhibiting enhanced thermal conductivity and comprising a fabric comprising at least one carbon nanotube (CNT) sheet and at least one fabric comprising a natural or synthetic fiber, said carbon nanotube sheet being synthesized via gas phase assembly in a pyrolytic reactor such that it exhibits CNT tubular alignment. The CNT sheet may comprise a CNTH material, for example, the CNT sheet may comprise at least one metallic or ceramic particle dispersed throughout the sheet or deposited on the sheet or both.

Another embodiment is directed to methods of manufacturing a yarn or fabric comprising CNTH material, the method comprising: manufacturing a carbon nanotube sock via gas phase assembly in a pyrolytic reactor; incorporating at least one particle selected from a metallic particle, a ceramic particle, a polymeric particle and combinations thereof, said incorporating comprising one or more of integrating during growth of the sock in the reactor, integrating by depositing on the sock subsequent to growth; and processing the sock into a fiber or sheet by winding or rolling, respectively.

Another embodiment is directed to a sensor for incorporation into a protective garment. The sensor comprises one or more CNTH materials, each CNTH material designed to detect a different potential toxic chemical.

These embodiments as well as additional embodiments and aspects will be detailed and clarified by reference to the figures and detailed description, below. Figures are included to illustrate specific embodiments and/or concepts and should not be construed as limiting the full scope of the invention as defined by the appended claims.

BRIEF DESCRIPTION OF THE DRAWINGS

FIG. 13A shows a schematic of the setup for testing in plane thermal conductivity. FIG. 13B shows in-plane testing of Material 2, and FIG. 13C shows the in-plane testing of CNT fabric.

FIG. 16A: an optical image of a CNT—Dyneema polymer composited fiber; FIG. 16B: an optical image of a composited Dyneema polymer and CNT sheet; FIG. 16C: optical image of a copper plated CNT Dyneema composite.

FIG. 17A: CNT Sheet/Dyneema composite yarn stitched into the Army fabric and showing delamination of the CNT sheet under tension; FIG. 17B: shows elimination of delamination by tweaking manufacturing process.

FIG. 19C: a log periodic bow-tie antenna manufactured from CNT material for toxic gas sensing testing.

FIG. 20A-D: Shows construction of a prototype glove with CNTH fabric; FIG. 20A shows an exemplary fire fighter glove with the inner soft layer removed and to the left of the outer abrasive/tough later; FIG. 20B shows a CNT-GAC sheet; FIG. 20C shows the CNT-GAC sheet overlayed and stitched to the top of the inner soft layer; FIG. 20D shows the glove after re-insertion of the inner soft layer having the CNT-GAC layer adhered.

FIG. 21A is a schematic of the test setup; FIG. 21B shows the actual experimental setup FIG. 21C is a bar graph of the comparative temperature data.

DETAILED DESCRIPTION

Figure 1:
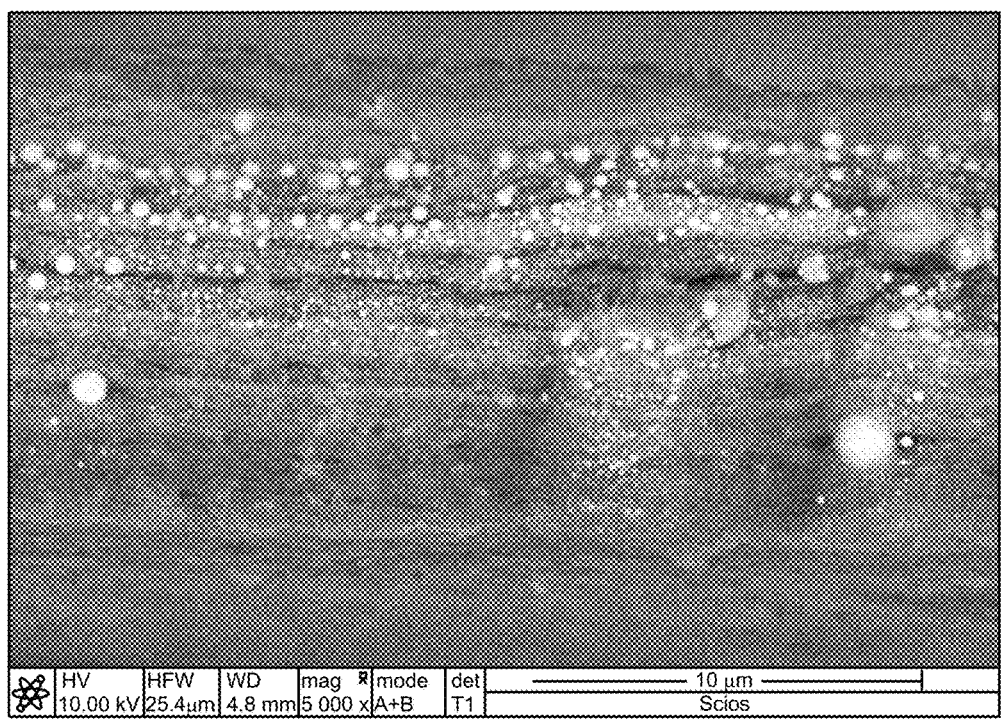
FIG. 1: scanning electron microscope images of an exemplary CNT-Cu hybrid material sheet showing a "through-the-thickness"/side view of the sheet.
Figure 1:
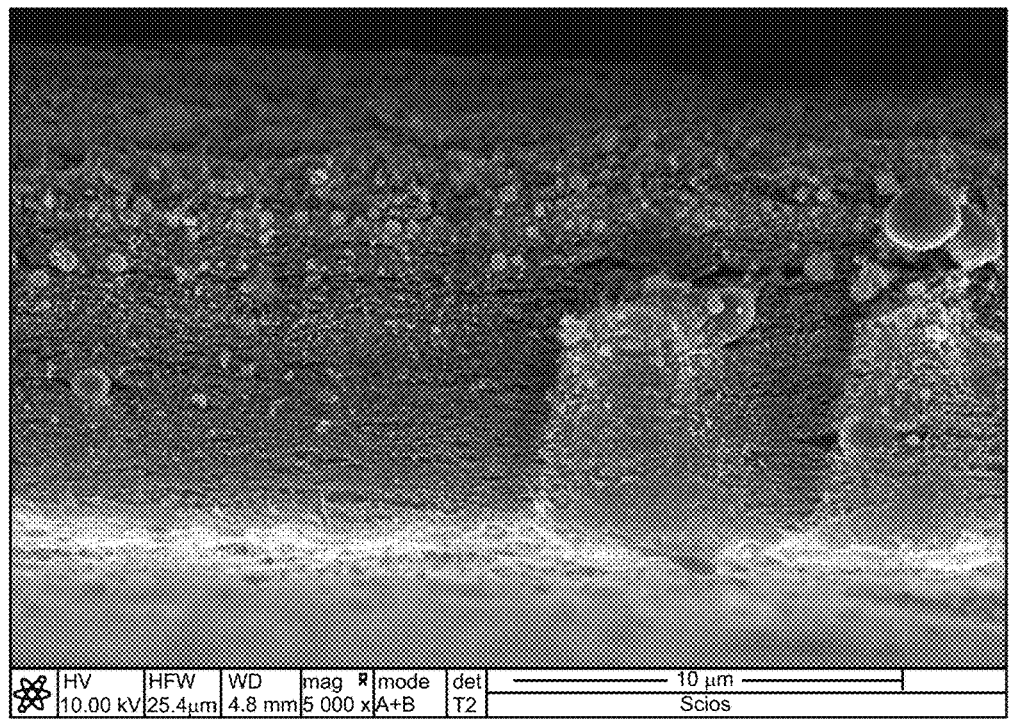

The CNTH material disclosed herein is light weight, strong but pliable, flame resistant, and can be tailored via incorporated particles to filter certain toxic gases and smoke particles from the air, or to provide other application-targeted functionality. The flame retardant and filtering properties of the sheet or fabric are ideal for personal protective apparel and personal protective equipment for firefighters, military combatants, pilots, and in any context where exposure to high temperatures is a risk. In some embodiments, the CNT sheet comprises sensor material to warn if the garment temperature is too high or that toxic chemicals are present in the air.

The present inventors recently developed a process to produce high quality CNT yarn and sheets and to integrate nano-particles or micro-particles into the sheet during a floating-catalyst synthetic process. This new patent-pending process (PCT/US18/19427) enables custom tailoring of the properties of the CNT material for specific applications. The pristine CNT material produced from this process is very high quality (Raman G/D ratio=100, TGA thermal breakdown >700 C) due to the unique synthesis process that uses positive displacement fuel injection within a venturi (replacing a nebulizer for better atomization) along with a higher temperature and shorter dwell time furnace (reduces defects) to produce CNT material that is remarkably tailored for firefighter and other high temperature applications. Particles integrated into the CNT synthesis process further improve and customize the properties of the CNT fabric.

One embodiment is directed to a yarn or fabric comprising a CNT or carbon nanotube hybrid (CNTH) material, wherein the CNT or CNTH material is synthesized by gas phase assembly and exhibits a degree of tubular alignment. CNT and CNTH materials produced according to the novel gas phase assembly process are distinguishable from those produced by other processes. For example, the CNT materials are very high quality as shown by the Raman G/D ratio. CNTH materials can have a wide range of properties not available in typical nanotubes and the properties are related to the constituent materials that are identified by chemical analysis such as through energy dispersive spectroscopy (EDX). Yarn may be formed by winding a sheet and twisting as it emerges from the pyrolytic reactor, or the sheet may be retained as flat and, in some specific embodiments, further processed. A CNTH material may be manufactured with any one or more of a wide variety of different nano or microparticles. In specific embodiments the NMP imparts desired target functionality to the CNTH material. In very specific embodiments the CNTH material comprises a carbon nanotube (CNT) sheet integrated with at least one particle type selected from Cu, Ag, Ag/Cu alloy, granulated activated carbon (GAC), ferrocene, Si, Alumina, Co/Fe alloy, diamond, $TiO_2$, carbon fiber, carbon particulate, powdered high modulus polyethylene (HMPE), and combinations thereof. According to even more specific embodiments, the particle type is Cu or Ag/Cu and the yarn or fabric is electrically conductive The CNTH material layer is flexible and comfortable and dissipates heat by evaporation and by conduction, radiation, and convection. CNT fabric is multi-purpose and, in addition to flame resistance, provides abrasion and impact resistance, electromagnetic shielding, reduces hot spots in the garment. The CNT fabric may be further tailored to provide increased flame resistance and filtering based on the types, sizes, and concentration of nanoparticles used.

Free-standing CNTH material can be attached to other fabrics via stitching or bonding to turnout gear fabric (due to their good mechanical properties, strength, pliability, toughness) to create a more fire-resistant garment for applications such as fighting fires. Moreover, because the flame-retardant character of CNT sheets is not based on addition of flame-retardant chemicals, they are safer because their combustion does not produce toxic fumes. Since CNT fabric it is tough and light weight, it may also be used for fire-protection systems for buildings, aircraft, cars and transportation systems.

CNT fabric may also be impregnated with materials such as granulated activated carbon capable of trapping or otherwise filtering toxic chemicals and smoke particles from the air. CNT fabric is uniquely suited to protect fire fighters facing the increasingly more severe and larger scale structural and wildland fire environments.

In part, due to its tubular capillarity, and small diameter and large surface area of the nanotubes, a CNT fabric layer transfers heat and uniformly cools better than conventional fabric materials. CNT fabric cools by all three heat transfer mechanisms, conduction, convention, and radiation. Generally, a CNT fabric ideal for heat transfer should have high in-plane thermal conductivity and low thermal conductivity normal to the plane. These properties can be readily achieved by integrating different types of nanoparticles (NPs) into the nanotube synthesis process to form a CNT hybrid (CNTH) material. Variations like a Kevlar®/CNTH blend or elastomer/CNTH blend are also possible. Nanotube fabric as produced is highly hydrophobic and may be plasma functionalized to clean the fabric and provide the desired moisture handling properties, either hydrophilic or hydrophobic depending on the application. CNT fabric also has high thermal absorptivity (cool to the touch feeling), low surface weight, and softness (comfort).

NPs are integrated into the nanotube sheet during the high temperature synthesis process. The nanotube fabric may be prepared with different type of nanoparticles (NPs) with different sizes, concentrations, and locations to customize the fabric for flame resistance, porosity, and to capture toxic chemicals and smoke.

CNTs have extraordinary mechanical and thermal properties, are lightweight, flame-resistant, and hydrophobic. CNTs also have thermally anisotropic behavior; that is, a single CNT fiber is highly conductive along its axis and relativity insulating across its radius. By creating a bulk textile material where the fibers are aligned in the plane of the material (conductive in-plane and more thermal insulating in the through the thickness direction), heat flow can be spread and the local hot spots can be reduced, thus increasing flame retardant properties.

Adding NPs to the CNT sheet allows filtering specific gases. As an example, adding granulated activated carbon (GAC) micro particles allows tailoring the porosity of the sheet, permits absorbing chemicals, and GAC can withstand high temperature and GAC is safe.

Gas assembly CNT and CNTH material synthesis.

The present inventors recently modified a gas phase pyrolysis synthetic method to improve the properties of the resultant nanotube materials (see, PCT/US18/19427). The inventive methods utilize a custom reactor with; (i) high flow rate of the gas; (ii) a short dwell time in the reactor, (iii) high temperature (e.g. 1400° C.) producing high quality CNT sheet, and (iv) a novel venturi injector that uses positive displacement of the fuel. A high G graphitic peak and almost no disorder D peak (G/D ratio of 100) in the Raman signature of the resulting CNT material indicates very high quality CNTs and little oxygen in the process.

The unique resultant CNT sheet is comprised of high quality SWCNT (Raman G/D~100), and low resistivity. The sheet may be densified, for example using acetone, and particles have been added to impart specific functionality. Post-synthesis processing such as rolling, pressing and stretching yield a stronger more resilient CNT sheet. The present inventors were the first to sufficiently control the CNT synthetic process to achieve particle injection into the gas phase synthesis reaction. Fuel injection and particle injection flow rates must be within a window of parameters in order to produce the CNT sock. NPs are injected into the inlet of the reactor tube wherein particle injection and sock formation depend on the size, aspect ratio, stiffness, and density of particles, along with process conditions. The injector design is a key aspect of the CNTH process, and a key innovation that enables the manufacture of the instantly inventive CNT and CNTH material yarns and fabrics.

Embodiments are directed to methods of manufacturing a yarn or fabric comprising a carbon nanotube (CNT) and/or carbon nanotube hybrid (CNTH) material. The methods comprise: manufacturing a carbon nanotube sock via gas phase assembly in a pyrolytic reactor; incorporating at least one particle selected from a metallic particle, a ceramic particle, a polymeric particle and combinations thereof, said incorporating comprising one or more of integrating during growth of the sock in the reactor and integrating by depositing on the sock subsequent to growth; and processing the sock into a fiber or sheet by winding or rolling, respectively. NMPs may be any particle (or fiber) that survives the pyrolytic process. In very specific embodiments, the at least one particle comprises one or more of Cu, Ag, Ag—Cu alloy, granulated activated carbon, Si, Alumina, a cobalt-iron alloy, $TiO_2$, carbon fiber, powdered high modulus polyethylene fiber, and carbon particulate.

Generally, integration of the NMP occurs during gas phase assembly and SEM images show that the particles are dispersed throughout the CNT sheet. Fine-tuning of the gas phase assembly process permits varying the concentration, load, and location of the NMP. According to some specific embodiments, NMP may be deposited on the surface of a CNT sheet, such as by spray-deposition. In other specific embodiments, integration occurs subsequent to gas phase assembly and a CNT sheet is applied to fibers. For example, according to an even more specific embodiment the fiber comprises carbon fiber arranged in a tow of carbon fiber, and a CNT sheet is applied to form a skin around the carbon fiber tow.

NMP constituents may include almost any material that will survive the synthesis process (the reaction temperature and time can be varied). Metals such as Ag—Cu are observed to melt and partly fill in the voids within the bundles of CNTs. Particles such as granular activated carbon (GAC) do not melt and pass through the process incorporated into the CNT sock without change. CNTH production is a differentiating capability that enables materials by design for specific applications. Multiple types and combinations of particles can be assembled simultaneously to form hybrid materials with properties that can be tailored for specific applications. Dry dispersion of NPs requires special injectors, and the assembly process is complex when multiple types and sizes of NPs are combined. Examples of CNTH materials are set forth in Table 1.

TABLE 1

Carbon Nanotube Hybrid (CNTH) Material Fabric Samples

| Material Type | Material Description | Exemplary Functionality |
| --- | --- | --- |
| 1. CNT-C-Cu | Carbon coated 25 nm Cu spherical particles with CNT, carbon is to improve dispersion | Electrical conduction between adjacent CNTs |
| 2. CNT-Cu | 100 nm Cu spherical particles with CNT | Electrical conduction, lower cost particles |
| 3. CNT-Ag-Cu | Silver coated copper platelets (~10 micron diameter, 200 nm thick). In the synthesis reaction, upon melting, the Cu platelets form spheres at the intersection of CNT bundles and this increases the strength and the electrical and thermal conductivity of CNT fabric. CHM reduces the problem of nanotubes sliding apart and electron hopping resistance that have been holding back ) applications of CNT fabric, (see FIGS. 1-3) | Electrical conduction, thermal conduction, to reduce corrosion of Cu, to increase wetting of the carbon nanotubes, to improve dispersion, to increase the area of the particle to join a greater number of CNT strands. This is a viable material to increase electrical conduction and thermal conduction of CNT fabric at a high production rate and at moderate cost. |
| 4. CNT-GAC | Granulated activated carbon (GAC) is micron size and easy to inject at large volume fraction into the nanotube synthesis reaction. GAC is used in household water filters and is considered safe. | Water filtration, air filtration, for example, incorporation of CNT-GAC fabric can be used in firefighter apparel to prevent toxic chemicals and particles from penetrating firefighter turnout gear, gloves, neck cover. |
| 5. CNT-GAC-Ferrocene | GAC and powder ferrocene (the catalyst to grow CNT) are mixed and injected into the CNT synthesis process and a CNT sock and fabric are produced. Injection of powder ferrocene provides more freedom in where during the process to inject the catalyst and it helps integrate the GAC within the CNT sock and fabric. | Catalyst is mixed with the GAC powder and injected which provides greater integration of the GAC particles within the CNT sock; enables use of smaller size GAC to tailor the porosity and surface area of the fabric for breathability, sweat wicking, and filtering surface area. CNT-GAC composited fabric is useful for sports apparel where breathability and wicking of sweat can be controlled to a greater extent. |

TABLE 1-continued

Carbon Nanotube Hybrid (CNTH) Material Fabric Samples

| Material Type | Material Description | Exemplary Functionality |
| --- | --- | --- |
| 6. CNT-Si | Silicon particles are injected into the synthesis process and integrated into the CNT sock and fabric. This sheet or fabric combines the CNT electrically conductive material with Si which is a ceramic material that does not melt or react with the synthesis process. Si is a non-interacting nanoparticle (NP) which means the particle goes through the synthesis process and the particle does not change. | CNT-Si fabric may be utilized to make a battery anode for lithium batteries. It eliminates the binder material and provides large cycling capability as the silicon is entrapped in the CNT fabric which enables the Si to still work as a battery material when the Si breaks into smaller pieces. |
| 7. CNT-Alumina | Alumina $Al_2O_3$ particles are a ceramic material NP injected into the synthesis process. Alumina NPs are non-interacting. | Increase thermal and flame resistance, hardness, and the abrasion resistance of CNT fabric. |
| 8. CNT-(alloy of Co-Fe) | Vacoflux ™50 is an exemplary alloy that comprises magnetic particles for use in soft magnetic composites. Vacoflux ™50 must be injected using a particle size of less than 100 microns to prevent the particles from settling out of the gas stream. | Electrical conductivity and magnetic permeability. Applications include wide band EMI shielding, electrical discharge, and potentially electric motor integrated core and winding material. |
| 9. CNT-Diamond | Diamond flakes are injected into the synthesis process. Diamond is a non-interactive material. | Abrasive and/or wear resistant material; blended optical properties. |
| 10. CNT-$TiO_2$ | Titanium dioxide is a light particle that has potential interactions and nanotube wetting in the nanotube synthesis process. | Photovoltaic devices, removing carbon dioxide from the atmosphere, medical use and implants, and structural materials. |
| 11. CNT-Carbon Fiber | Micron length CF lends to plug the injector and a special injector is utilized to inject larger aspect ratio micron-sized particles. | High thermal properties and enhanced strength at reduced cost. |

Post Processing.

Post-processing encompasses, for example, drawing the sock into a sheet, densifying the material using solvent, rolling, pressing and optionally coating the material. A rolling mill may compact CNT sheet with NPs to increase the density and therefore increase the conductivity, flame retardant property, and strength.

In some embodiments, additional processing of a CNT/CNTH fiber or sheet may include one or more of heat-treating to remove any residual hydrocarbons, rolling a sheet under pressure, and spraying with a densifying material such as acetone. The CNT/CNTH sheet may be layered on or between layers of fabric comprising fiber selected from natural fiber, synthetic fiber, and combinations thereof. In some embodiments, layering comprises bonding the CNTH sheet to at least one layer of natural or synthetic fabric using an adhesive, application of pressure, application of heat, stitching, or combinations thereof. In certain very specific embodiments, a tape may be fed into a pyrolytic reactor during gas phase assembly such that CNTH material is deposited directing onto the material. In more specific embodiments, the material comprises a high modulus polyethylene fiber or sheet/tape.

The currently employed floating catalyst method gives hundreds of microns length to mm length on average for nanotubes. The quality of the tubes (ideally straight walls, no amorphous carbon) is a critical factor in making highly thermally conductive and flame resistant fabrics. The current floating catalyst process produces Fe impurities. The properties of nanotube materials are summarized in Table 2.

According to some embodiments, a sensor capable of monitoring the air for toxic gases and smoke may be integrated into the CNT/CNTH fabric. CNT material electrical resistivity decreases with temperature. Thus the CNT sheet itself is a sensor. This enables temperature sensors to be integrated throughout the fabric to monitor the temperature and safety profile of the fabric. It would be inconvenient to have many thermocouple or thermistor sensors in the garment whereas the CNT temperature sensors are part of the garment itself. CNT and CNTH yarn can be used to replace Cu wire, which is bulky and prone to failure. The CNT sheet can be functionalized to change electrical resistance upon contact with certain chemicals. Thus the CNT sheet can also act as a chemical sensor and multiple sensors can be distributed throughout the garment.

According to some embodiments, temperature sensors are incorporated into the CNT sheet. Specifically CNT-graphene hybrid sheets may be incorporated into the garments as the fabric itself, or laminated onto, for example, Nomex. The advantage of the CNT graphene composite is higher thermal and electrical conductivity and a more linear sensitivity (change in resistance with temperature). The sensor can withstand high temperature and may be connected to a wireless transmitter.

Figure 19A:
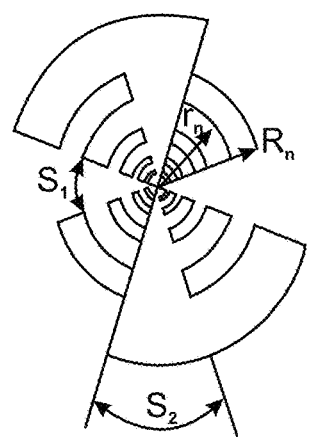
FIG. 19A: An image of a typical Log Periodic Tooth Bow-Tie antenna.
Figure 19B:
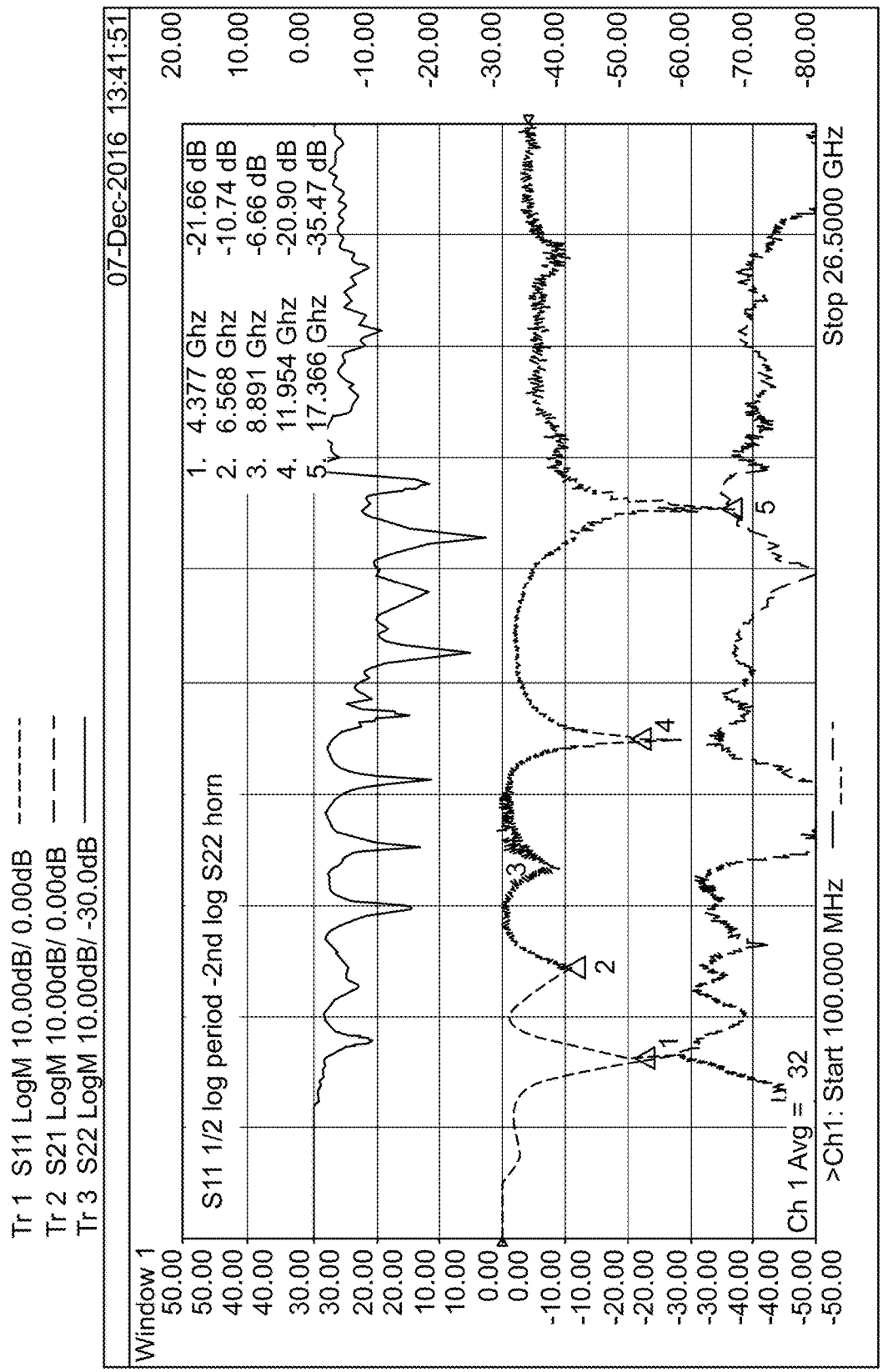
FIG. 19B S11 (gold trace) and S21 (blue trace) of a brass Log Periodic Tooth Bow-Tie Antenna with the second order teeth removed.

According to some embodiments, CNT sheet material is used to fabricate a CNT antenna/gas sensor. This antenna structure combines radiating elements with different characteristic length scales and therefore different operational frequencies. The basic premise for the operation of the Antenna/Sensors is that these different length (frequency) elements can be treated so that each responds chemically and electrically to different gases. These chemical/electrical responses would then result in changes in the EM radiating characteristics of the antenna only at the frequency of that particular radiating element. Therefore, if the different mode regions of the antenna have specific, localized surface functionalization for different gasses, then in the presence of one (or more) of these gasses, only those regions will change electrically which will show up as changes in the radiation characteristics of the antenna but only at specific frequencies. A Log Periodic Tooth Bow-Tie Antenna is shown in FIG. 19A. These antennas have different radiating teeth (or arm) lengths that resonate at distinct frequencies, as shown in FIG. 19B. This antenna structure lends itself very easily to making a combined antenna/gas sensor since each set of teeth may be treated to respond to different gasses. To test this, tests were carried out on whole antennas, followed by transmission tests where different sets of teeth were removed. The results clearly demonstrate that different modes disappear when the second and third sets of teeth are removed. A log periodic antenna made from CNT sheet is shown in FIG. 19C. One embodiment contemplates articles comprising CNT/CNTH sensors. A sensor may comprise one or more CNTH materials, each capable of sensing a different chemical or condition. In very specific embodiments, the sensor comprises a log periodic antenna.

Fabric chemical filtration testing CNTs have been studied as air filtration material due to their high surface area and large aspect ratio. The diameters of CNTs (normally ranging from 1 nm to 10 nm) are significantly smaller than the electrospun fiber (ranging from 100-500 nm) used in commercial air filters. It is known that when fiber diameter decreases, filtration performance is enhanced because of the higher surface area and smaller pore size. Furthermore, with the fiber diameter smaller than the mean free path of air, the CNT filter may have a lower impact on the air flow (i.e., lower pressure drop). In the literature, high efficiency particulate air filters were made using aligned carbon nanotube sheet. The CNT sheets were drawn from millimeter tall CNT arrays, and then sandwiched between regular polypropylene micro-fiber fabrics to form aerosol filters. Testing showed that the filtration performance increased with the number of CNT layers used, while the pressure drop also increased. The air filter consisting of three layer cross-ply CNT sheet provided 99.98% filtration efficiency at 0.3 micron particle size at a 10 cm/s face velocity, proving a viable method for making lightweight HEPA filters utilizing CNT sheet as the main filtration component. Hierarchical filter structures for removing air pollutant with CNT deposited on various fiber or porous matrix have been widely studied. CNTs grown on quartz fiber, nickel, carbon fiber, glass fibers, micromachined Si/SiO2 porous structure, Al2O3 and SiO2 ceramic matrix have exhibited good filtration efficiencies for various particle sizes. In addition, CNT was deposited as a layer of coating on the top of a cellulose filter or a polypropylene and polyamide membrane for enhanced air filtration. Hybrid CNT structures coated with *Sophora flavescens* nanoparticles were synthesized for antimicrobial air filtration. In addition to being effective for removal airborne particles, CNTs demonstrated the capability to remove a wide range of metal ions including Cu2+, Pb2+, Cd2+, Zn2+, Mn2+, Co2+, Ni2+, Cr2+, Hg2+ and U6+ through absorption by different functionalization and synthesis techniques. CNT has the potential to be used in aligned sheet form or to be hybridized with other functional materials to remove airborne particulate, bacterial, pathogen, heavy metal and other toxins that firefighters/first responders encounter.

The porosity can be controlled by the NPs to enable breathability and filtering. Activated carbon air filters are the most effective type of filter against chemicals, gases, smoke and odors. Activated carbon air filters consist of a vast system of pores of molecular size. These pores are highly adsorbent, forming a strong chemical bond/attraction to odorous, gaseous, and liquid contaminates, especially organic chemicals/compounds. Activated carbon air filters trap odors and chemicals in highly absorbent granules (or pores), which look like a hard scrub brush. Activated carbon is a charcoal that is treated with oxygen in order to open up millions of tiny pores between the carbon atoms, resulting in a highly adsorbent material that was originally used in World War II to protect U.S. soldiers from chemical warfare agents. CNT-GAC sheet provides a highly effective composite filter.

A study that surveyed the air at nine municipal structural fires showed that the composition of the air was quite similar in all cases and contaminated by volatile organic compounds (VOCs). The VOCs are mainly benzene along with toluene and naphthalene. The study showed that propene and 1,3-butadiene were found in all of the fires surveyed, and other VOCs such as styrene and other alkyl-substituted benzene and other over substances were frequently identified and accounting for 76.8% of the total VOCs measured. Some of the VOCs such as benzene are classified by International Agency for Research on Cancer (IARC) as "carcinogenic" to humans.

The firefighter nanofabric apparel made from CNT-GAC sheet provides an effective barrier against VOCs and other toxic gaseous chemicals by protecting the human body while still allowing small water molecules (sweat) to pass through. Activated carbon is a proven versatile absorbent for toxic gas molecules and liquid aerosols, and is widely used in respirators.

CNT fabric is nonwoven as compared to conventional textiles used in firefighter garments which are woven. The nonwoven fabric has much smaller diameter fibers (nanometer versus micrometer) and is produced by directly winding up a sock (like a cylindrical spider web) onto a drum and using solvent evaporation to collapse the sock in to a film. Continuously building up the thickness of the film forms a sheet or fabric. A post processing step is to roll the fabric in a rolling mill to increase its density and to consolidate the particles in the material. Overall, the process to manufacture CNT fabric is simpler than the process to make current fabrics which involve fiber extrusion, forming bundles, followed by weaving. The particles are integrated into the high temperature process and assemble within the sock during the synthesis process and are uniformly distributed throughout the sheet. Rolling densifies the fabric/particles, and the breathability will be controlled. Nanotube sheet optionally can be coated with a micro-thin film and layered with other fabric for protection from abrasion and to provide additional protection to avoid shedding nanotubes.

A "composited" material or fabric according to the present disclosure is one in which two or more fabric materials are bonded together, for example by lamination, stitching or use of an adhesive material. Yarn may also be composited, such as when strands of different types are wound into a single fiber of yarn. According to some embodiments, a composited material comprising a yarn or fabric aspect of invention and at least one other natural or synthetic fiber is provided. According to more specific embodiments, the at least one other fiber comprises an aramid fiber. Aramid fibers are known for use in the production of bulletproof vests and wear-resistant products because of high tensile strength, durability, and the like. Aramid fibers may be drawn into a yarn shape and typically the yarn is spoolable. The production of aramid fibers having CNT grown directly on the fiber is known (see, e.g. U.S. PPN 2011/0171467, the entire disclosure of which is incorporated herein); however these fibers are known to delaminate at high temperature and under abrasive conditions. In very specific embodiments the aramid fiber is selected from poly-paraphenylene terepthalamide (Kevlar®), Nomex™, and Technora™.

In other embodiments the composited material comprises at least one high modulus modulus polyethylene (HMPE) fiber. Non-limiting examples include Dyneema™ and Spectra™, which are lightweight high-strength oriented-strand gels spun through a spinneret. They have yield strengths as high as 2.4 GPa (240 kg/mm² or 350,000 psi) and density as low as 0.97 g/cm³ (e.g. for Dyneema™ SK75). High-strength steels have comparable yield strengths, and low-carbon steels have yield strengths much lower (around 0.5 GPa). Since steel has a specific gravity of roughly 7.8, these materials have a strength-to-weight ratios eight times that of high-strength steels. Strength-to-weight ratios for Dyneema™ are also about 40% higher than for aramid.

Articles of personal protective equipment/apparel are also provided. The articles are fabricated with a yarn or fabric comprising CNT/CNTH yarn or sheets, or composited material comprising CNT/CNTH yarn or sheets. Non-limiting examples of such articles include flame-resistant and/or heat resistant clothing selected from jackets, pants, chaps, gloves, socks, foot covers, head covers, and cover-all body suits, flame-resistant and/or heat resistant body wraps, towels, blankets, sleeping bags, transport bags, shelters, and parachutes. Any article that is worn or used by a subject at risk of exposure to high temperature conditions and/or the presence of toxic airborne substances or smoke is contemplated. According to very specific examples, the article comprises yarn or fabric that is electricity conducting or generating and comprises a CNTH material comprising one or more of CNT-Cu, CNT-Cu—Ag, and CNT-C—Cu. In other specific embodiments, the article comprises a CNT-GAC material that adsorbs, aborbs and/or filters one or more toxic chemicals. Articles comprising CNTH yarn or fabric comprising more than one NMP conferring one or more characteristics/function to the CNTH fabric and to the article are contemplated.

In one specific embodiment, a glove exhibiting enhanced thermal conductivity and comprising a fabric comprising at least one carbon nanotube (CNT) sheet and at least one fabric comprising a natural or synthetic fiber is provided. The carbon nanotube sheet is synthesized via the novel gas phase assembly process disclosed herein. The CNT sheet may be a CNTH sheet comprising at least one metallic, ceramic, or polymeric particle dispersed throughout the sheet or deposited on the sheet or both. In some embodiments, the least one natural or synthetic fiber comprises a synthetic fiber selected from a meta- or para-aramid fiber, for example poly-paraphenylene terepthalamide (Kevlar®), Nomex™, Technora™, and combinations thereof.

The glove may comprise a cuff. In specific embodiments, the cuff comprises a heat sink. An example of a heat sink is a fan, for example, a battery-operated fan. Heat-resistant batteries are known in the art. In very specific embodiments the glove may comprise a microprocessor comprising a thermostat that adjusts at least one heat-conducting property of the glove. Remote control of the processor enables remote and automatic adjustment under user demand.

The toxic threats of smoke containing heat, organic and inorganic irritants, CO, HCN, HCl, H2S, etc. will induce sensory irritation of eyes and tearing, resulting in impaired vision and result in coughing, choking, gagging from throat, and bronchial irritation and heart attack. Exposure to these chemical can also cause cancer and other diseases later. Protective garments are contemplated as a complete system of components: outer shell, moisture barrier, thermal barrier and face cloth designed to provide protection from hazards or gaseous/vapor phase chemicals which present respiratory and skin threats. Representative samples from different layers of firefighter's garment after fire events have been analyzed to identify concentrations of toxic gases remaining on different garment layers and the deterioration mechanism caused by the absorbed chemicals. XRF results and the IGA test shows the concentrations of chloride, Sulfur and other elements which represent toxic containments remaining on garments that gradually accumulated when used. This demonstrates the need for the nanofabric filter layer to filter these contaminants from collecting and passing through the garment.

The task of designing an ensemble capable of providing appropriate thermal protection to the user while also filtering particles and chemicals from the user's environment is complex. The two functions work against each other: thermal protection tries to shield against a wide range of thermal exposures, while filtering is related to breathability, and heat dissipation and seeks to prevent overheating while wearing the PPE. The CNTH material garment provides greater freedom to achieve the optimal balance of performance to resist heat while maximizing mobility and breathability.

TABLE 2

Properties of Carbon Nanotube Sheet and yarn (properties are approximate).

| Property | Nanotube Sheet and Tapes |
| --- | --- |
| Tensile Strength (GPa) | 0.5-1.2 |
| Elastic Modulus (GPa) | 100 |
| Strain to failure (%) | Up to 15 depending on pre-stretching |
| Electrical Resistivity (ohm cm) | $2 \times 10^{-4}$ |
| Thermal Conductivity W/(mK) | 30-100 in plane depending if the sheet is stretched or not, 1-2 normal to the plane, (through the plane thermal conductivity can be as low as 0.03-0.05 if the material is loosely packed with air inside), this extreme anisotropy in thermal conductivity is from 100:1 to 15:1 |
| Thermal Diffusivity (mm^2/s) | To be measured |
| Sheet Resistance (ohm/square) | 0.3 (depends on acid treatment, stretching, direction) |
| Seebeck Coefficient (microV/K) | −60 n type, 70 p type (potentially up to 300) |
| Density (g/cc) | 0.1-1.2, depends on densification |
| Burning Temperature in Air | High resistance to flame |

| Property | Nanotube Yarns |
| --- | --- |
| Tensile Strength (GPa) | 3 (up to 4 in thin tapes) |
| Elastic Modulus (GPa) | 200 |
| Strain to failure (%) | 4 |
| Electrical Resistivity (ohm cm) | $1 \times 10^{-4}$ |
| Density (g/cc) | 1.1 |
| Thermal Conductivity W/(mK) | 160 |

Firefighter garments for structural firefighting usually have three different types of layers with each layer performing a specific function FIG. 2A. The outer layer is tough and abrasion resistant and resists heat and flame. The moisture barrier is the center layer which protects the firefighter against water and certain chemicals. This layer must also be strong, tough, and breathable to allow perspiration to move away from the body. The inner layer is the thermal barrier which prevents heat from transferring through the garment. The thermal barrier uses a combination of heat resistant materials and air pockets. A face cloth is typically attached to the inner side of the thermal barrier to provide a soft material to contact the undergarments. A stitch pattern with air pockets, FIG. 2B, can be used to decrease thermal conductivity in the through-the-thickness direction of a CNTH fabric. A fire fighting heat flow model was developed for initial understanding and design of a suitable garment, FIG. 2C. Heat flows from hot to cold so operation of the garment can be controlled via switches that connect the different four parts of the garment thermally to each other. A thermal switch may be formed in theory by a thermoelectric device that applies voltage to stop heat flow. CNT material is thermoelectric but the Seebeck coefficient is relatively small. Another approach is a mechanical vacuum/pressure switch that clamps sections of CNT fabric together to provide heat transfer or not. For simplicity, zippers can be used initially and the user can open/close these as determined by the cooling algorithm, FIG. 2D. Thermocouples interfaced to a computer chip will tell the user if the switches (zippers) should be opened or closed. Computer controlled switches may be employed with automatic remote control.

Current protective apparel has air openings between the gloves and coat, coat and pants, and pants and boots. These gaps reduce heat transfer and allow air to enter the garment. An integrated connected layer is needed that filters air before it enters the garment. CNT fabric conducts heat from hot to cooler areas of the garment, for example to boots that may have a porous bottom to transfer heat to water.

Evaporation of water or sublimation of dry ice are found to be the most efficient ways to remove heat. However, carrying ice within a garment for cooling is not convenient. Thus, according to some embodiments a thin CNT fabric layer is added to conduct a significant amount of heat to the air and also to a heat sink such as boots, exploiting the high thermal conductivity of the CNT material. The thickness of the fabric can be designed to conduct the amount of heat desired. The heat sink must have the heat capacity to accept and dissipate part of the heat load for the firefighter.

Finite Element Heat Transfer Analysis of the CNTH nanofabric Layer with a cold region (boots). This is a summary of a finite-element analysis of a firefighter wearing the nanofabric garment with a cold reservoir such as boots that are kept wet. Conduction heat transfer from the nanofabric layer to the cold region is modeled. No diffusion, convection or evaporation are modeled. The cool boot is not modeled specifically. It is assumed there is enough water to keep the boot at a constant temperature. The abbreviated analysis is shown below. The quantity of heat Q that passes (conducts) through a material of thermal conductivity k, cross-sectional area A, length d, with a temperature difference dT, in time t is given by $Q=k*A*t*dT/d$. This is the quantity of heat the nanotube layer will conduct. Carbon nanotubes are thermally anisotropic, meaning they easily conduct heat along the axis of an individual fiber, and are relatively insulating across the fiber's radius. Utilizing this anisotropic behavior, heat transfer through a carbon nanotube fabric layer in a garment can be partially redirected to a heat sink (cooler area) thereby protecting the wearer from heat stress and exhaustion.

Finite Element Analysis (FEA) models were developed to simulate a CNT layer embedded in a firefighting garment thermally connected to a cold boot. The model developed provides guidelines on performance, but is approximate. Here, only conduction heat transfer is modeled. The commercial software used for the analysis is ANSYS. In this simulation, only the core section of the body was modeled as it houses the vital organs. To best represent the system and reduce assumptions, the body of the wearer, each individual layer of the garment, the cold boots as a heat sink, the air gap between the body and the garment, and the environment were modeled within the selected boundary. The CNT layer was modeled to be a part of the firefighting garment, surrounded by traditional fabric on either side. The cold region boot was connected to the nanotube layer in the center of the model. A parameter study was performed for the system by subjecting the model to four different conditions: (1) hot environment (40° C.) and light work (332 Watts); (2) hot environment and strenuous work (889 Watts); (3) firefighting environment (58° C. [4,12,20]) and light work; and (4) firefighting environment and strenuous work. Within these four cases, parameters of the firefighter garment were also changed: two thermal conductivities of the CNT layer, two thicknesses of the CNT layer, and two temperatures for the cold pack were evaluated in the study. Together, thirty-two different simulations were performed. Four additional simulations were performed (one for each condition case) without the CNT layer and cold region to represent the traditional garment and provide results for comparison.

The model simulates twenty minutes of exposure to the environment. This was done following a study from Wang et al. (Physiol. Meas. 2011 vol. 32, no. 2, pp. 239-49) which showed that the skin temperature of firefighters wearing firefighter garments in hot conditions while being physically active had the highest rate of change during the first 20 minutes of exposure. The thermal properties of the materials used in the model are listed in Table 3. The average skin temperatures found with the CNT and cold boots cases were compared to the respective datum case of the standard firefighting garment to observe the improvement using a CNT layer with a cold pack. With the CNT layer and cold region, the skin temperature after exposure was on average 4° C. lower than the models without the CNT layer and cold pack. To provide a quantitative interpretation to the results: the initial skin temperature was 33° C., cells can only survive +42° C. temperatures for a limited time (at 50° C. cells start to die after about 16 min). General trends are: (i) a thicker CNT layer increases cooling and reduces skin temperature; (ii) the higher thermal conductivity CNT layer reduces skin temperature; (iii) the higher environmental temperature increases skin temperature; and (iv) a lower temperature cold region produced lower skin temperature and has a greater effect than doubling the thickness of the CNT layer. These results provide guidelines on future design. With the wet boots in ice water the skin temperature was reduced 6° C. avg. This is the most favorable condition but it will not be possible to have ice water cooling for the boots in most cases. Even with the wet boots at the higher temperature of 20° C. (68° F.), and using the thicker CNT layer with the lower thermal conductivity (the easiest to achieve design), skin temperature was reduced significantly by 3.7° C. and 5° C. for the two environmental temperatures. The main result is the CNT layer reduces skin temperature 4° C. average for a nominal working condition for a firefighter. Every simulation with the CNT layer and cold pack reduced the skin temperature compared to a simulation without the CNT layer and cool section. The high thermal conductivity of the nanotube layer draws the heat from the garment and, with a cold region modeled within the boots, keeping the skin temperature below the danger level even though the firefighter is in a hot environment.

TABLE 3

Thermal properties and density of the materials used in the finite element model.

| Material/Properties | CNT | Outer Shell | Moisture Barrier | Thermal Liner | Human Body | Air |
|---|---|---|---|---|---|---|
| $\rho\left(\frac{kg}{m^3}\right)$ | 900 | 1410 | 1380 | 1416 | 1000 | 1.16 |
| $k\left(\frac{W}{mK}\right)$ | 80; 262* | 0.145 | 0.25 | 0.125 | 0.613 | 0.026 |
| $c_p\left(\frac{kJ}{kgK}\right)$ | 0.830 | 1.338 | 1.256 | 1.354 | 4.179 | 1.007 |

*Lower and upper range axial values are listed, the corresponding approximate radial values for through-the-thickness conduction are;
 0.46, 1.73 $\frac{W}{mK}$, respectively.

For safety reasons, it is importation that CNT fabric not shed, that is, nanotubes must not be released from the fabric. Production of long nanotubes and post processing/coating can prevent nanotubes from being released from the fabric. In addition, the outer layers of CNTH are pristine CNT material which has been shown to not shed or release from the fabric. CNT fabric according to the novel methods of manufacture is formed of mm long CNT that are tightly integrated together in the sheet. In the reactor, the CNT assemble into a sock that is wound onto a drum and densified using a solvent and a rolling mill. The CNT and hybrid NP particles are tightly connected in the sheet. Notably, the EPA has classified long CNTs as "articles" and not "particles," meaning that they are too large to be inhaled or absorbed by the skin. CNTH fabric made according to the inventive methods is safe for use as personal protective apparel. According to some embodiments, the CNT/CNTH sheet may be coated with a micro-thin film or laminated with other fabric for protection from abrasion and to provide additional protection to avoid shedding nanotubes under extreme conditions.

The following examples are provided to illustrate underpinning concepts and specific embodiments and aspects of the invention and should not be construed as limiting the full scope thereof.

EXAMPLE 1

The following Example illustrates aspects of novel CNT-hybrid (CNTH) material utilized to make CNT sheet or fabric and then composited fabric (composited fabric, as used herein, is defined as a fabric comprising both CNT and another fabric), and further demonstrates differences between CNTH and pristine CNT. It is known in the art to use CNT yarn to make a fabric. According to known methods, a CNT "sock" emerging from the CNT synthesis reactor must be twisted to form yarn and the yarn must be woven to form fabric. This is an expensive multi-step process. According to the inventive methods disclosed herein, a CNT hybrid sock is rolled onto a drum directly from the synthesis reactor to form the sheet in a one-step process that is both time and cost-efficient when compared to using yarn. According to specific embodiments, hybridization (e.g. injection of metal particles onto the emerging CNT sock or incorporation of metal particles during the gaseous phase) results in CNTH material that may be stronger, more thermally and electrically conductive, or having other desired functional features. The scanning electron microscopic (SEM) images set forth as FIG. 1 illustrate the structure of the CNTH material which is a significant basis for differentiation. Chemical analysis reveals that the metal is present in the CNT sheet.

Synthesizing Carbon Nanotube Hybrid Materials

CNTH materials are formed by injecting particles into a pyrolytic reactor in the gas phase. (see Int'l Patent App No. PCT/US18/19427 filed 23 Feb. 2018, the entire disclosure of which is incorporated herein by reference). A significant advantage of the CNTH process is that metals and ceramics can be integrated directly into the nanotube synthesis process which is efficient for large scale manufacturing of CNTH materials. The carbon nanotube hybrid fabric formed can be customized for specific applications. CNTH material synthesis is a one-step process in which the integrated metal or ceramic can be physically and or chemically linked to the CNT sock and the resulting sheet or yarn. Nanotube bundles are bonded together to increase the properties (strength and conductivity) of a nanotube sheet. Table 1 sets forth exemplary CNTH material. A CNTH material fabric may be composited (e.g. layered with other fabric) to form cloth for fabrication of personal protective equipment exemplified by towels, blankets and garments.

Figure 2:
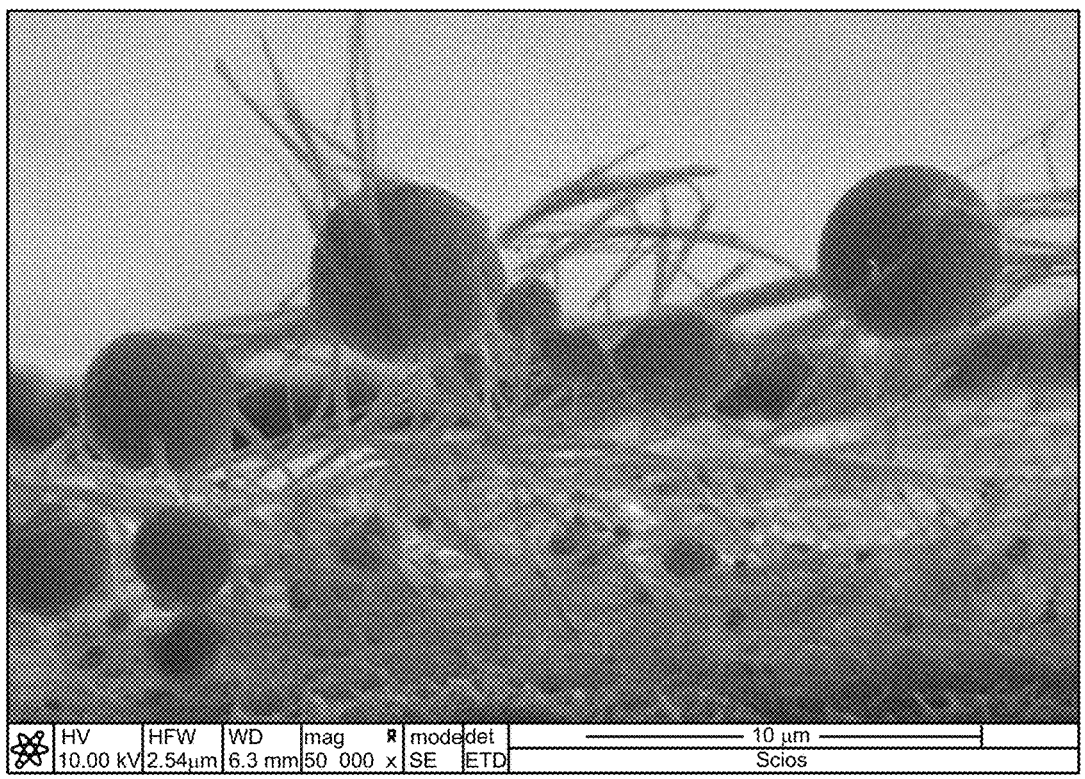
FIG. 2: SEM images at 50,000× and 15,000× magnification of a CNT-Ag/Cu hybrid material sheet. The spherical particles are Ag-coated Cu nanoparticles (NPs) which formed from thin platelets injected into the gas phase assembly process. The NPs are integrated with the CNT strands imparts improved strength, and electrical and thermal conductivity to the sheet.
Figure 2:
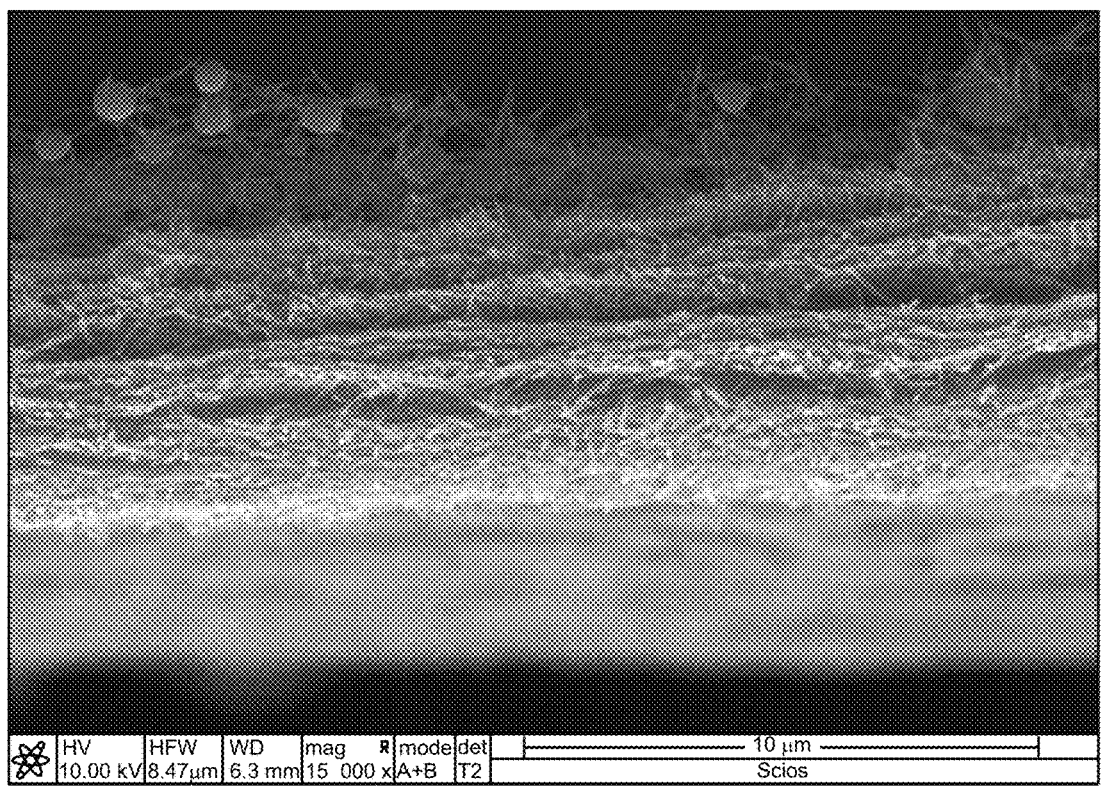
Figure 3:
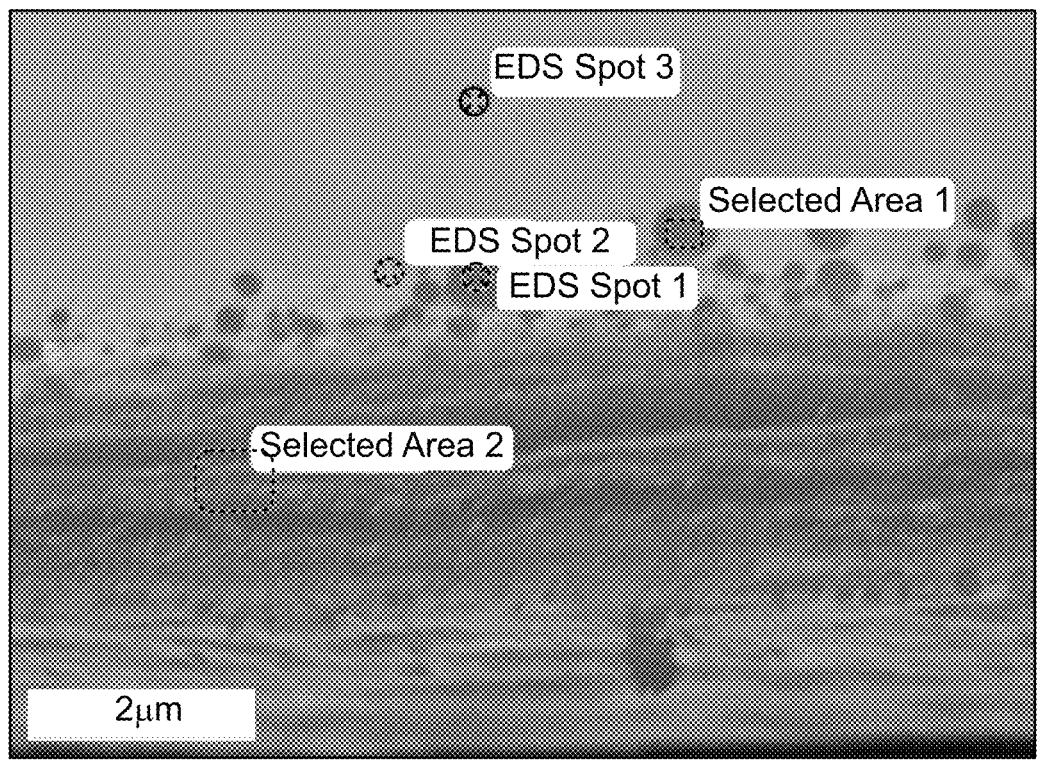
FIG. 3: shows where EDAX (energy-dispersive X-ray spectroscopic) measurements were taken on the CNT-Cu—Ag Sample.
Figure 4:
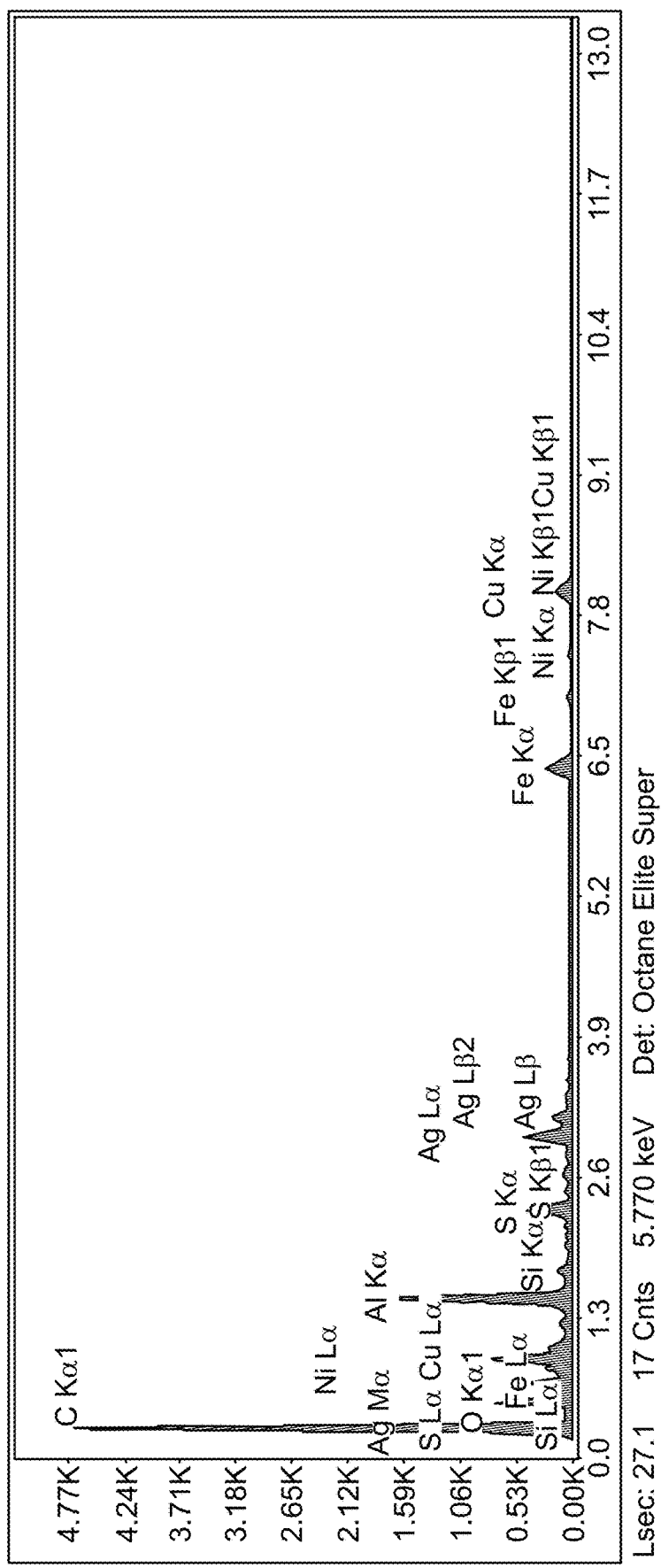
FIG. 4: EDAX results from area 2, det 1 as defined in FIG. 3.

FIG. 1 sets forth SEM images of a CNTH material sample comprising integrated copper nanoparticles (NPs). FIG. 2 shows two magnifications of SEM images of a CNTH MATERIAL sample comprising integrated Ag/Cu particles. It is observed that the metal particles "glue" nanotubes into bundles which improves the electrical conductivity of the sheet and also increases the mechanical stiffness and strength of the fabric. EXAX analysis of the sample depicted in FIG. 2 was performed in a number of areas on the sheet (see FIG. 3) and the analytical/composition results were determined. FIG. 4 sets forth the specific EDAX results for area 2, det 1, and Table 4 sets forth the corresponding eZAF Smart Quant results for each area.

TABLE 4

| eZAF Smart Quant Results from area 2, det 1. | | | | | | | | |
|---|---|---|---|---|---|---|---|---|
| Element | Weight % | Atomic % | Net Int. | Error % | Kratio | Z | A | F |
| C K | 59.31 | 80.92 | 1034.71 | 6.35 | 0.3121 | 0.9866 | 0.5334 | 1.0000 |
| O K | 6.96 | 7.12 | 130.36 | 12.87 | 0.0187 | 0.9507 | 0.2831 | 1.0000 |
| AlK | 8.61 | 5.23 | 499.45 | 4.27 | 0.0592 | 0.8580 | 0.7986 | 1.0029 |
| SiK | 0.04 | 0.02 | 2.44 | 99.99 | 0.0003 | 0.8791 | 0.8280 | 1.0050 |
| S K | 2.78 | 1.42 | 142.88 | 5.76 | 0.0228 | 0.8654 | 0.9385 | 1.0116 |
| AgL | 7.01 | 1.06 | 150.67 | 7.49 | 0.0512 | 0.6664 | 1.0954 | 1.0019 |
| FeK | 6.95 | 2.04 | 127.46 | 5.78 | 0.0570 | 0.7621 | 1.0075 | 1.0680 |
| NiK | 1.11 | 0.31 | 16.08 | 19.97 | 0.0093 | 0.7733 | 1.0036 | 1.0725 |
| CuK | 7.23 | 1.86 | 83.00 | 7.42 | 0.0560 | 0.7358 | 1.0042 | 1.0489 |

The EDAX and eZAF results show the presence of the Ag and Cu metals and also impurities in the sample including aluminum which comes from the sample holder and possibly the reactor alumina tube.

EXAMPLE 2

This example illustrates an embodiment of making continuous hybrid fiber based on continuous carbon fiber (CF). This hybrid material has very high strength and good thermal properties. The CNT sheath makes the carbon fiber tougher to resist brittle fracture and the CNT sheath shields the carbon fiber from the environment such as UV and chemicals that degrade the carbon fiber. This CNT-CF tow (bundle of CF with a CNT or CNTH sheath) can be used for weaving to form multifunctional garments for first responders such as firefighters, and, for example, military combatants.

Hybrid Continuous Fiber (HCF)

This is a hybrid of continuous fiber such as carbon fiber (CF) and CNT formed in the CNT synthesis reactor by pulling thin CF tape or other fibers or tape through the high temperature nanotube synthesis reactor to produce CF with CNT and optionally nanoparticles (NPs) integrated over the tape. Different types of NPs can be integrated into the process. The CNT sock deposited onto the CF tape integrates everything (CF, NPs) together. The stock fiber can be carbon fiber (CF), metal wire or any fiber or wire or combination of fibers and wire that will withstand 15 seconds duration at 1400° C. in an inert gas environment. Advantages of the fabric are:

1. HCF can be formed in many variations by using different fibers, combinations of fibers, different NPs, and with different process conditions for forming CNT.
2. By injection of short carbon fibers (e.g. from Zoltec) into the reaction.
3. By drawing long carbon fibers (e.g. from Toray, Hexcel) through the reactor. Carbon will dissolve in liquid iron and if the Fe catalyst is deposited on the CF it may affect the strength of the CF.
4. Ferrocene (catalyst) can be mixed with the CF or metals and injected.
5. HCF Functionally graded CNT sheet will increase the yield of the synthesis process.
6. HCF sock can be used with NPs for air filtering in garments, and to provide flame resistance for fabric.
7. HCF can increase electrical and thermal conductivity for composites.
8. HCF may be integrated with textile fibers to form functional apparel.

Figure 5:
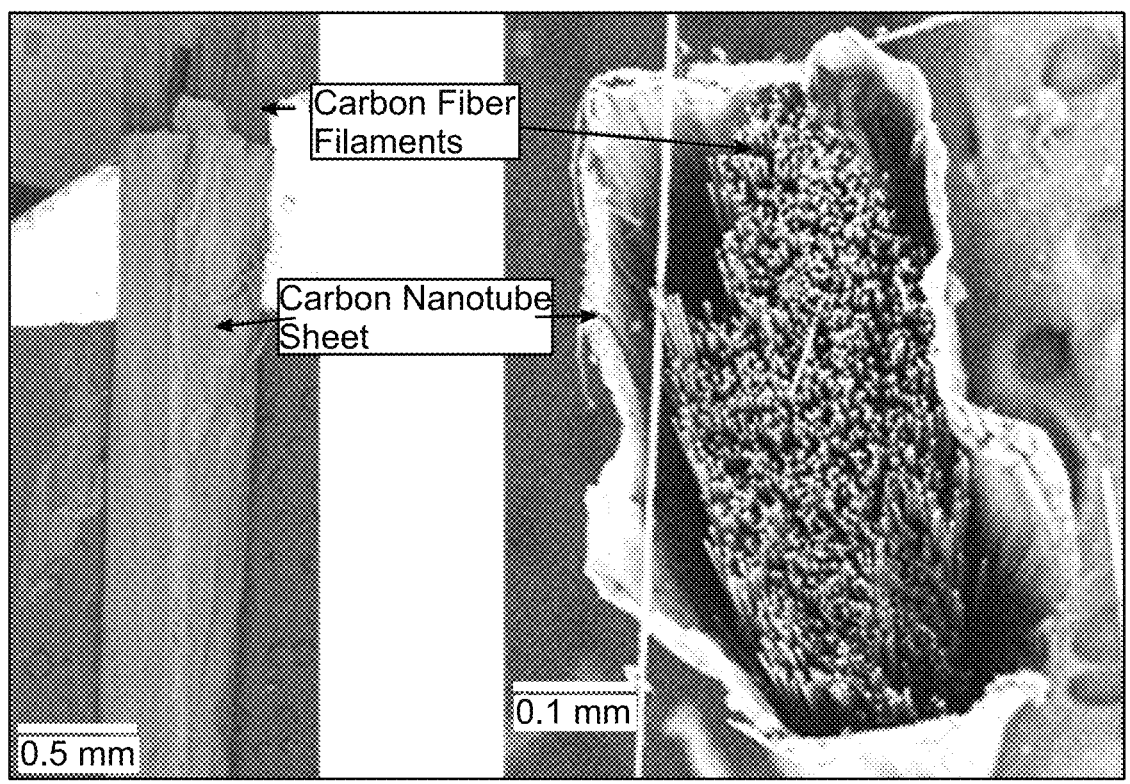
FIG. 5: Lateral and cross-sectional SEM images of CNT-Carbon Fiber hybrid material. The CNT sheet acts like a skin over the Carbon fiber tow which is composed of 3000 carbon fiber filaments.

Other fibers, for example manufactured cellulosic and protein fibers may be engineered (shape, diameter, texture) and utilized in a CNT fabric substrate or blended into the CNT yarn to produce effects/properties that are complimentary to the pure or hybridized CNTH sheet or yarn handled by the high temperature of the reactor. Naturally derived materials may be integrated with CNTH fabric in a later processing step. Fibers that can withstand high temperature can be integrated directly within the CNTH synthesis process to form a continuous roll-to-roll Carbon Nanotube-Carbon fiber composite fiber. Adhesion of the CNT to other fibers by van der Waals theory may be exploited to coat traditional fibers with a CNT skin to produce fabric that has engineered properties. It can be seen that the Carbon Nanotube sheet helps in holding the carbon fiber filaments together (FIG. 5). As the Carbon Nanotube-Carbon Fiber Composite material is synthesized at high temperature there is no sizing left on the Carbon Fiber material. The individual filaments of the carbon fiber can be seen from the SEM images. The CNT-Carbon fiber tows may be used in tape laying machines to build custom composite materials.

EXAMPLE 3

This example illustrates design of a smart glove comprising CNT and CNTH material and analysis of the cooling performance of the glove. The simulation indicates the inventive glove permits the hand to withstand much higher temperature and operate in more thermally extreme environments. The hand and arm are marginal thermal conductors. Thus by adding a highly thermally conductive layer and a way to remove heat, by convection here, the hand can operate in a much more severe environment or else the glove material can be made thinner and more dexterous based on the heat spreading capacity of the CNT layer.

In a conventional glove, the top and bottom of glove can be at different temperatures because heat is not spread throughout the glove because the thermal conductivity of the glove is low. The arm cannot conduct much heat away from the hand due to the low thermal conductivity of tissue and water. If in a hot environment for an extended time, eventually the hand reaches close to the ambient temperature of the environment. The glove thermal insulator material protects the hand for a limited time.

The novel smart glove comprises a CNT layer inside the thermal insulation layer. The CNT layer conducts heat away from the hand to a cool area in the cuff of the glove. Air is circulated over the CNT in the cuff to remove heat. Thus, with the CNT layer, heat is conducted away from the glove/hand and the hand is kept much cooler in the steady-state and transient conditions for a given temperature difference between the environment and hand. A significant heat flux will flow from the CNT layer in the glove to the CNT layered region in the cuff of the glove in order to keep the hand temperature low. The CNT layer pipes the heat to a cuff where it is removed primarily by convection. Without the CNT layer, the hand would eventually approach the temperature of the environment. The largest component is the environmental heat. Metabolic heat from the hand is not large. To the extent that metabolic heat from the body is removed from the hand via the piping mechanism, the smart glove functions to cool the body.

Figure 6:
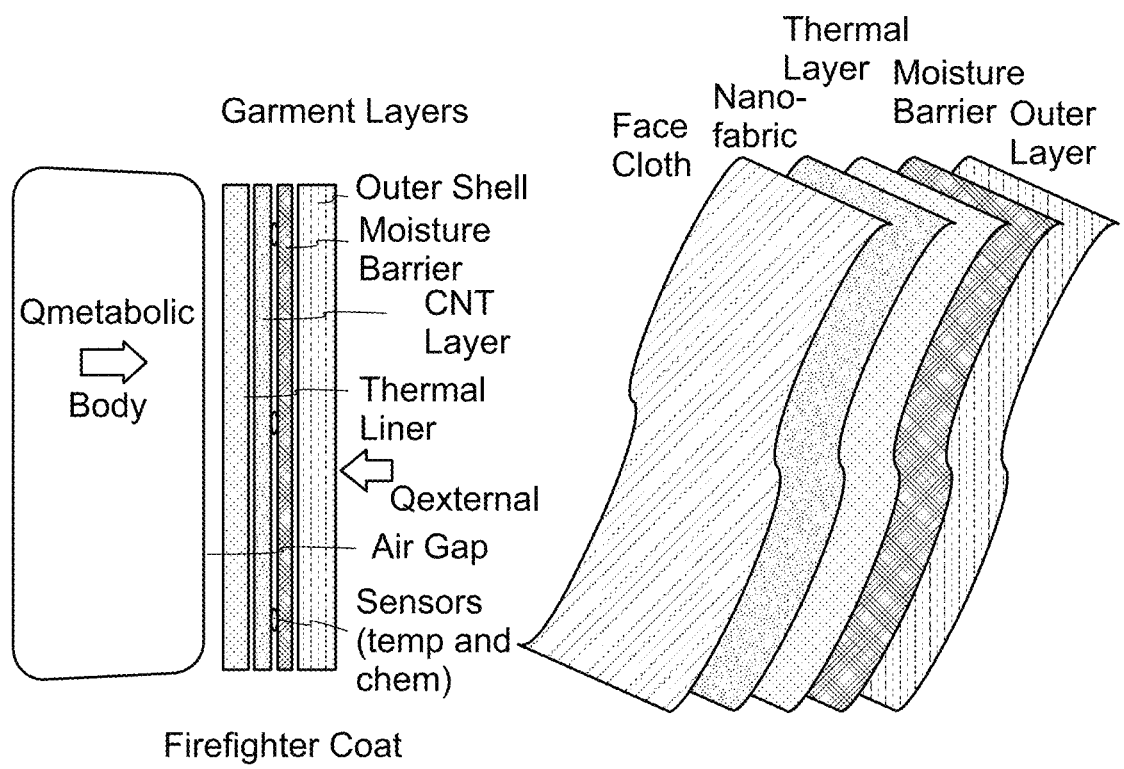
FIG. 6: Schematic examples of cloth designs showing layering of different fabrics.
Figure 6:
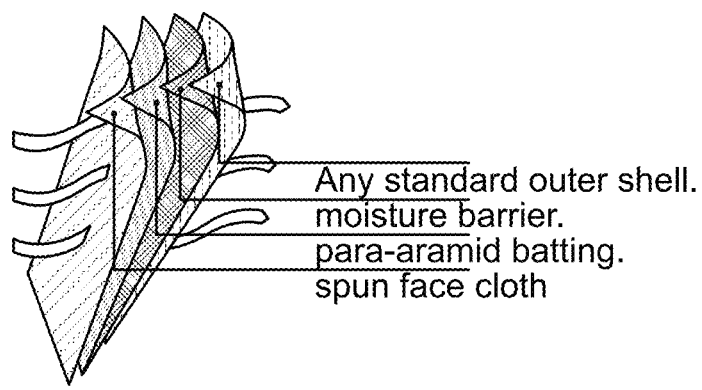
Figure 7:
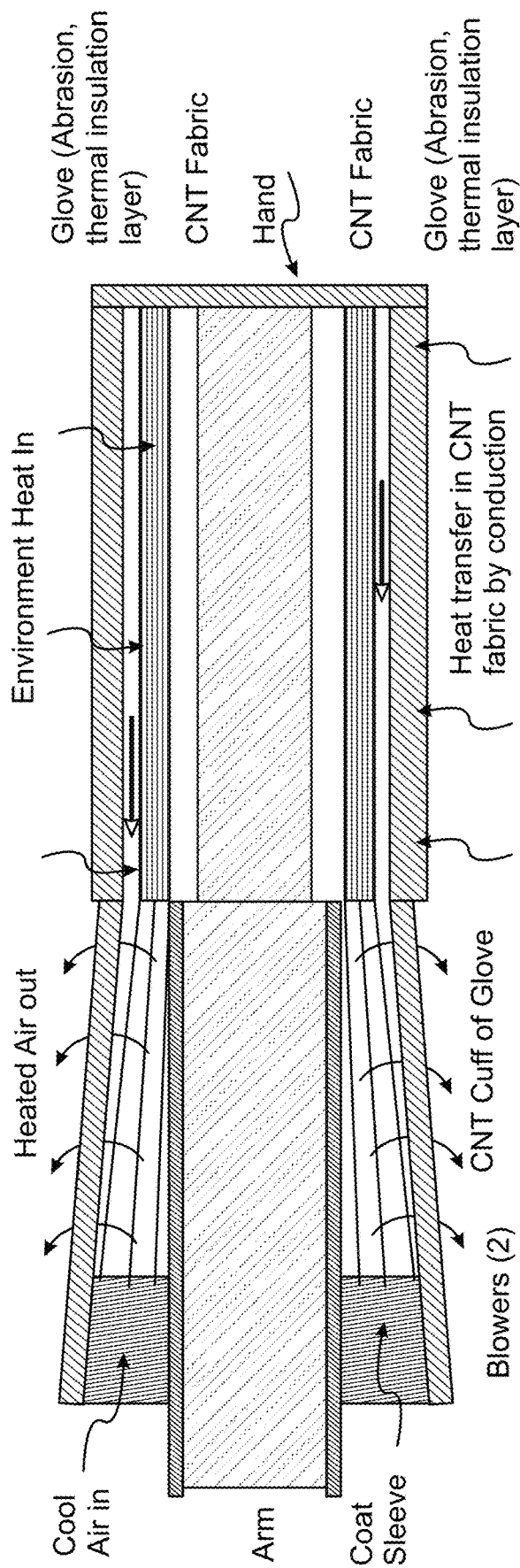
FIG. 7: Schematic cross-section of an embodiment of a glove design showing fabric layering and functionality.

The cuff may comprise many separate layers. When compared to a conventional firefighter glove, a thinner glove may be used because the CNT layer keeps the hand cool. More dexterous and tactile properties of the smart glove are realizable. The CNT fabric may be tailored with a high density section for conduction, no nanoparticles, and a low density section for convection with nanoparticles. NPs in the CNT sheet may improve the strength and the thermal conductivity of the material. Testing with a thermal IR camera indicates that convection cooling occurs before conduction can transfer heat along a CNT sheet. A specific illustrative design of a heat resistant coat is set forth in FIG. 6. A second specific illustrative design of a heat resistant glove is set forth in FIG. 7.

The operation of the glove cooling system is spreading heat from the hand to the cuff and from the cuff to the outside air. According to specific embodiments, one or more suitably sized fans, for example battery powered fans, are used to wick heat from the cuffs. A microcontroller such as an Arduino™ board and a thermocouple may be employed to thermostatically control the temperature of the glove. Air circulating in the cuff and evaporation both act to cool the CNT. The design is adaptable. For example, Wildland and structural fires have different evaporation and air flow demands. The smart glove concept can be applied to most other garments for first responders, athletes, and consumer products.

A glove may be fabricated as thin and flexible. According to one embodiment, a glove is designed to transfer heat from the hand to a cuff where the heat is dissipated using the large surface area and wicking capillarity of the CNT material, which may be made hydrophilic by acid treatment. The NPs in the CNT fabric control the porosity and increase the thermal conductivity and flame resistance of a CNT fabric. Some NPs can also absorb particles and toxic gases and chemicals, for example, from a fire-fighting context.

The temperature of the glove may be controlled using a feedback system where a computer chip uses temperature measurement input at the hand via a thermocouple to control the fan speed, and thus controlling the cooling to optimize battery life and comfort of the wearer, for example, a Fire Fighter (FF). This enables the wearer/FF to set the desired temperature of the glove depending on the working condition. Because it is thermostatically controlled, the glove may also be heated in cold working conditions. Other items of PPE apparel operating under similar principles, for example, coats, pants, boots, and shirts, are also contemplated. In some cases, feedback is analyzed remotely by a computer processor and adjustment is automatic.

Figure 8:
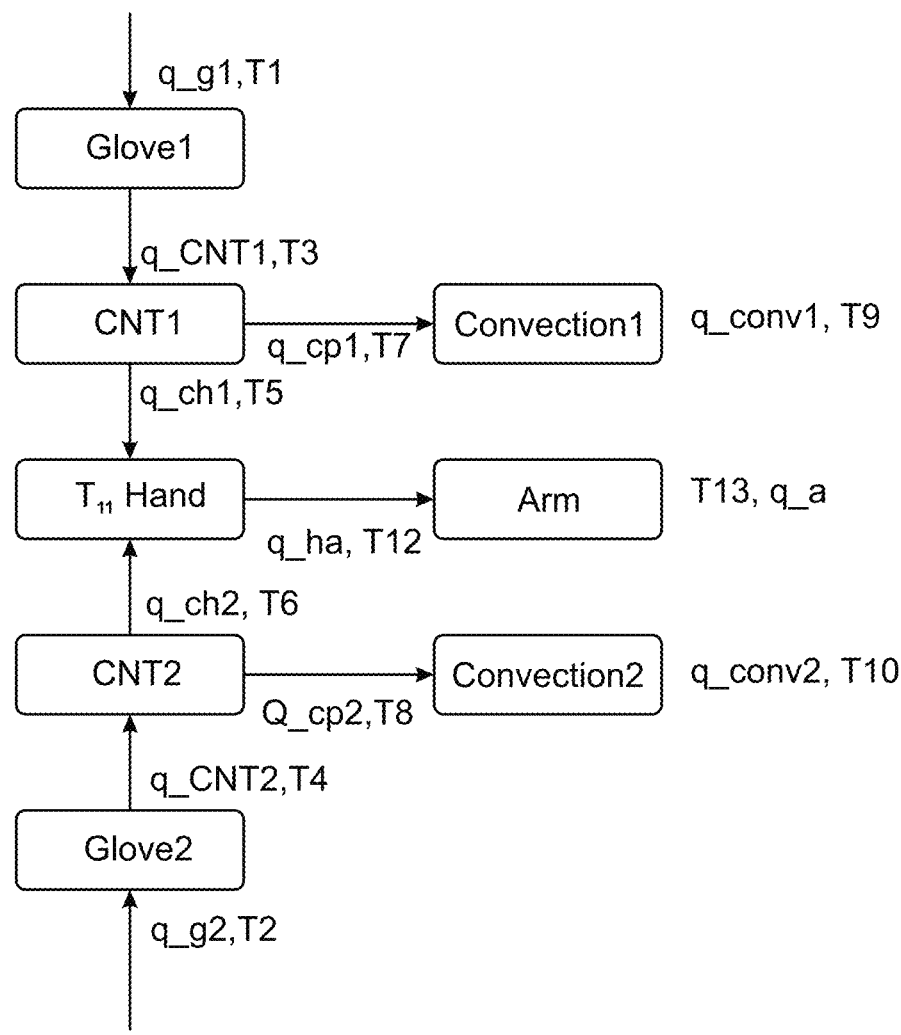
FIG. 8: Schematic of analytical model of heat transfer in a gloved hand with and without a CNT material cooling layer.

The present inventors developed an analytical model to simulate heat transfer in the glove/hand and to provide standards against which the smart gloves according to embodiments of the invention may be assessed. The model comprises 22 parameters and comprises conduction and convection heat transfer aspects. Evaporation and radiation heat transfer were not modeled but could increase the cooling depending on the conditions of use. Simulation experiments show that the glove temperature can be kept near body temperature (37° C. to 42° C.) when the gloved hand is in a 100° C. environment in the steady-state. Without the CNT layer, the hand could not remain in this environment for any amount of time. The analytical model is depicted schematically in FIG. 8.

According to one embodiment of the model, conduction and convection were used to simulate the heat transfer in the glove. The glove is separated into two parts, one is the up side and another is down side. The equations and theory of both sides is same. The heat transfer by conduction of the glove equals that of CNT sheet layer, so we get $q_{g1}=q_{CNT1}$ (1). The heat transfer rate by conduction of upper layer of the glove equals $q_{g1}=P_g \times (T_1-T_3)$ (2). $P_g$ means $$\frac{KA}{L},$$

where K is the thermal conductivity of glove, A is area of glove, L is thickness of glove. T1 is the environment temperature and T3 is the temperature between the glove layer and CNT sheet layer. The heat transfer rate by conduction of CNT sheet equals $q_{CNT1}=q_{ch1}+q_{cp1}$ (3). $q_{ch1}$ is the heat transfer rate by conduction of CNT sheet to hand and direction is vertical, and $q_{cp1}$ is the heat transfer rate by conduction of CNT sheet to convection model, whose direction is horizontal.

$$q_{cp1} = P_{cp} \times \left(T_7 - \frac{T_3 + T_5}{2}\right). \tag{4}$$

$P_{cp}$ means $$\frac{KA}{L},$$

where K is heat conductivity of CNT sheet to convection model, A is section area of CNT sheet, L is length of CNT sheet to convection model. T7 is temperature between CNT sheet and convection model, and T5 is temperature between CNT sheet and hand. The heat transfer rate by convection equals $q_{convection1}=P_{conv} \times (T_7-T_9)$ (5). $P_{conv}$ means $\overline{hc} \times A$, where $\overline{hc}$ is average convection heat transfer coefficient over the area A, and A is area of convection model. T9 is temperature at the end of convection model, which is set as around 40 Celsius degrees. The heat transfer rate by conduction from CNT sheet layer to hand equals $q_{ch1}=P_{ch} \times (T_3-T_5)$ (6). $P_{ch}$ means $$\frac{KA}{L},$$

where K is heat conductivity of CNT sheet to hand, A is area of CNT sheet, L is length of CNT sheet to hand. The heat transfer rate by conduction of hand on the upper side equals $q_{h1}=P_h \times (T_5-T_{11})$ (7). $P_h$ means $$\frac{KA}{L},$$

where K is heat conductivity of hand, A is area of hand, L is half of the thickness of hand. T11 is temperature at center of hand. The heat transfer rate by conduction of hand to arm equals $q_{ha}=P_{ha}\times(T_{11}-T_{12})$ (8). $P_{ha}$ means $$\frac{KA}{L},$$

where K is neat conductivity of hand to arm, A is section area of hand, L is half of the length of hand. T12 is temperature between hand and arm. The heat transfer rate by conduction of arm equals $q_a=P_a\times(T_{12}-T_{13})$ (9).

The equations relevant to the down-side of the glove include: the heat transfer by conduction of glove equals that of CNT sheet layer, $q_{g2}=q_{CNT2}$ (10). The heat transfer rate by conduction of down side of the glove equals $q_{g2}=P_g\times(T_2-T_4)$ (11). T2 is the environment temperature and T4 is the temperature between the glove layer and CNT sheet layer. The heat transfer rate by conduction of CNT sheet equals $q_{CNT2}=q_{ch2}+q_{cp2}$ (12). $q_{ch2}$ is the heat transfer rate by conduction of CNT sheet to hand and direction is vertical, and $q_{cp2}$ is the heat transfer rate by conduction of CNT sheet to convection model, whose direction is horizontal.

$$q_{cp2} = P_{cp} \times \left(T_8 - \frac{T_4 + T_6}{2}\right). \qquad (13)$$

T8 is temperature between CNT sheet and convection model, and T6 is temperature between CNT sheet and hand. The heat transfer rate by convection equals $q_{convection2}=P_{conv}\times(T_8-T_{10})$ (14). T10 is temperature at the end of convection model, which is set as around 40 Celsius degrees. The heat transfer rate by conduction from CNT sheet layer to hand equals $q_{ch2}=P_{ch}\times(T_4-T_6)$ (15). The heat transfer rate by conduction of hand on the down side equals $q_{h2}=P_h\times(T_6-T_{11})$ (16). The heat transfer rate by conduction of hand to arm also equals $q_{ha}=q_{h1}+q_{h2}$ (17), as well as $q_{ha}=q_a$ (18). At the same time, $q_{h1}=g_{ch1}$ (19), $q_{h2}=q_{ch2}$ (20). And $q_{cp1}=q_{conv1}$ (21), $q_{cp2}=q_{conv2}$ (22).

A Convection Model is Simulated Separately.

The average Nusselt Number is $Nu_L=0.664\times Re_L^{0.5}\times Pr^{1/3}$, where Nusselt number (Nu) is the ratio of convective to conductive heat transfer across (normal to) the boundary.

$$Nu_L = \frac{\text{Convective heat } ctransfer}{\text{Conductive heat transfer}} \cdot Re_L = \frac{U_\infty \times L}{v}.$$

The Reynolds number is the ratio of inertial forces to viscous forces within a fluid which is subjected to relative internal movement due to different fluid velocities, in which is known as a boundary layer in the case of a bounding surface such as the interior of a pipe. In this equation, $U_\infty$ is the velocity of the fluid with respect to the object (m/s), L is a characteristic linear dimension (m), v is the kinematic viscosity of the fluid ($m^2/s$).

$q_{convection}=h_c\times Area\times\Delta T\cdot h_c$ is average convection heat transfer coefficient over the area A.

The 22 equations identified above by numerical designator can be set forth in a matrix so that it can be queried in MATLAB. The matrix equation and MATLAB algorithm are not shown to save space. To observe how significant CNT sheet layer is, we simulate the model with no CNT sheet layer.

TABLE 5

| Model output data 1 | | |
| --- | --- | --- |
| T3_Temperature_between_Glove_and_CNT1 | 366.6454 K. | 93.49538° C. |
| T5_Temperature_between_CNT1_and_Hand | 366.6454 K. | 93.49538° C. |
| T7_Temperature_between_CNT1_and_conv1 | 313.15 K. | 40° C. |
| T12_Temperature between_Hand_and_Arm | 323.1592 K. | 50.00925° C. |
| T4_Temperature_between_Glove_and_CNT2 | 366.6454 K. | 93.49538° C. |
| T8_Temperature_between_CNT2_and_conv2 | 313.15 K. | 40° C. |
| T6_Temperature_between_CNT2_and_Hand | 366.6454 K. | 93.49538° C. |
| T11_Temperature_at_Center_of_Hand | 366.5234 K. | 93.37341° C. |
| q_glove1 | 0.975694 W | |
| q_CNT1 | 0.975694 W | |
| q_ch1 | 0.975694 W | |
| q_cp1 | 1.07E−08 W | |
| q_conv1 | 1.07E−08 W | |
| q_h1 | 0.975694 W | |
| q_ha | 1.951387 W | |
| q_a | 1.951387 W | |
| q_g2 | 0.975694 W | |
| q_CNT2 | 0.975694 W | |
| q_ch2 | 0.975694 W | |
| q_cp2 | 1.07E−08 W | |
| q_conv2 | 1.07E−08 W | |
| q_h2 | 0.975694 W | |

The results from the output Table 5 show that the temperature at the center of the hand without a CNT sheet layer is 366.5234K, which is 93.37341° C. This is an extreme simulated condition. The CNT sheet layer is then added to the simulation with a natural convection model, which means that there is no air flow velocity over the glove. The $h_c$ of air in natural convection model is 10, which is average convection heat transfer coefficient over the area A.

TABLE 6

| Model Output data 2 | | |
| --- | --- | --- |
| T3_Temperature_between_Glove_and_CNT1 | 322.403 K. | 49.253° C. |
| T5_Temperature_between_CNT1_and_Hand | 322.3983 K. | 49.2483° C. |
| T7_Temperature_between_CNT1_and_conv1 | 320.5505 K. | 47.40052° C. |
| T12_Temperature_between_Hand_and_Arm | 312.9704 K. | 39.82043° C. |
| T4_Temperature_between_Glove_and_CNT2 | 322.403 K. | 49.253° C. |
| T8_Temperature_between_CNT2_and_conv2 | 320.5505 K. | 47.40052° C. |
| T6_Temperature_between_CNT2_and_Hand | 322.3983 K. | 49.2483° C. |
| T11_Temperature_at_Center_of_Hand | 322.3719 K. | 49.22186° C. |
| q_glove1 | 7.61205 W | |
| q_CNT1 | 7.61205 W | |
| q_ch1 | 0.211532 W | |
| q_cp1 | 7.400518 W | |
| iq_conv1 | 7.400518 W | |
| q_h1 | 0.211532 W | |
| q_ha | 0.423064 W | |
| iq a | 0.423064 W | |
| q_g2 | 7.61205 W | |
| q_CNT2 | 7.61205 W | |
| q_ch2 | 0.211532 W | |
| q_cp2 | 7.400518 W | |
| q_conv2 | 7.400518 W | |
| q_h2 | 0.211532 W | |

Thus it may be observed that the temperature at the center of the hand drops to 49.22° C. When compared to 93.37° C. under the no CNT sheet layer situation, the temperature is shown to decrease 47.3%.

Temperature of Hand vs Velocity of Air Flow

Figure 9:
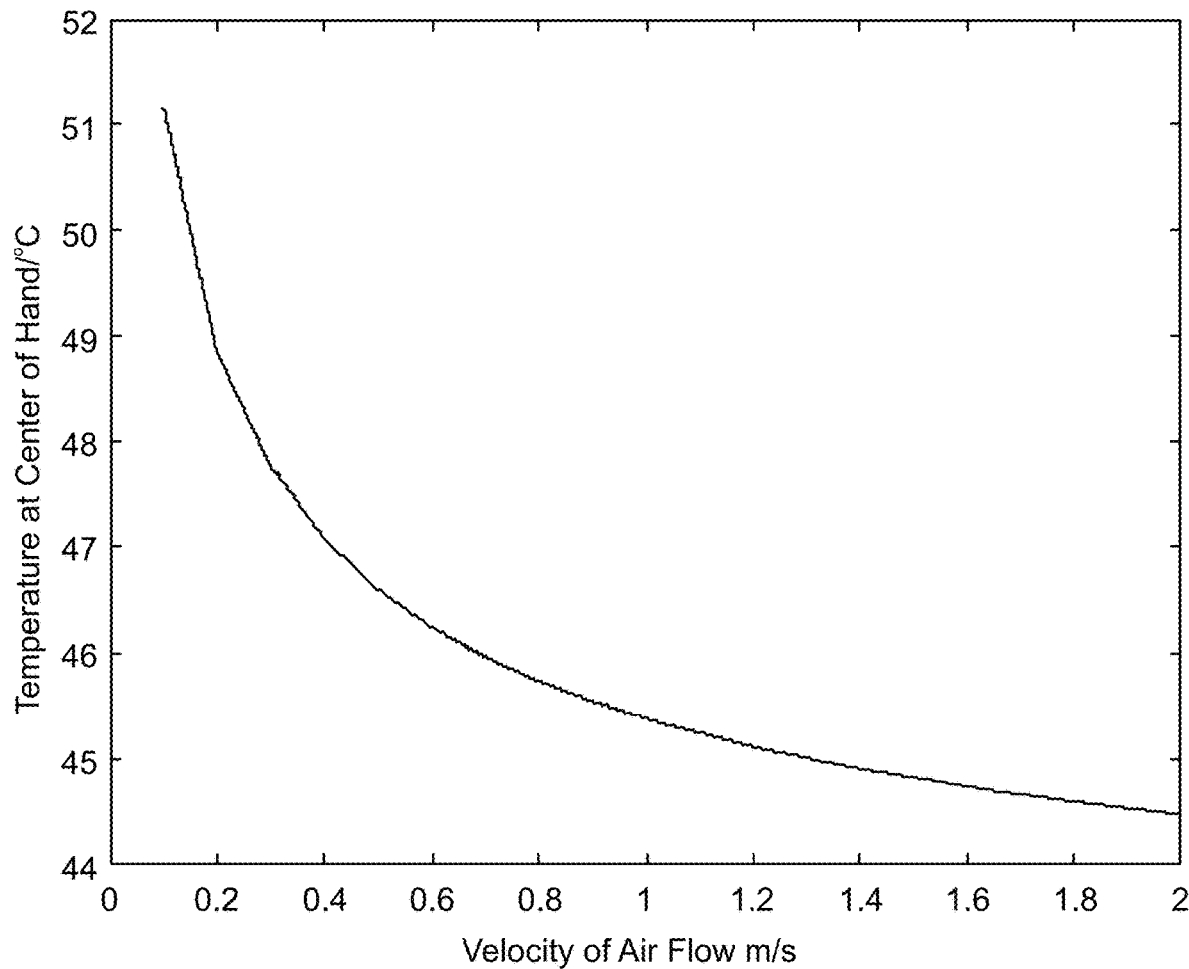
FIG. 9: Graphical representation showing the temperature at center of the gloved hand as a function of the velocity of the cooling air in the cuff of the glove.

Now air flow is added to the convection model. FIG. 9 is a graph of the relationship between velocity of air flow and temperature at the center of the hand. Room temperature was set at 40° C. With the increasing velocity of air flow, the temperature at the center of hand drops. As can be observed, when the velocity of air flow increases from 0.1 m/s to 2.0 m/s, the temperature of the hand decreases from 51° C. to 45° C. The velocity of air flow should be as large as possible given design constraints and the selection of fan employed. The data based on a flow of 1 m/s is set forth below in Table 7:

TABLE 7

| Model Output data 3 | | |
|---|---|---|
| T3_Temperature_between_Glove_and_CNT1 | 318.5525 K. | 45.40246° C. |
| T5_Temperature_between_CNT1_and_Hand | 318.5492 K. | 45.39923° C. |
| T7 Temperature between CNT1_and_conv1 | 316.5397 K. | 43.3897° C. |
| T12_Temperature_between_Hand_and_Arm | 312.0841 K. | 38.9341° C. |
| T4_Temperature_between_Glove_and_CNT2 | 318.5525 K. | 45.40246° C. |
| T8_Temperature_between_CNT2_and_conv2 | 316.5397 K. | 43.3897° C. |
| T6_Temperature_between_CNT2_and_Hand | 318.5492 K. | 45.39923° C. |
| T11_Temperature_at_Center_of_Hand | 318.5311 K. | 45.3811° C. |
| q_glove1 | 8.189631 W | |
| q_CNT1 | 8.189631 W | |
| q_ch1 | 0.145058 W | |
| q_cp1 | 8.044574 W | |
| q_conv1 | 8.044574 W | |
| q_h1 | 0.145058 W | |
| q_ha | 0.290115 W | |
| q_a | 0.290115 W | |
| q_g2 | 8.189631 W | |
| q_CNT2 | 8.189631 W | |
| q_ch2 | 0.145058 W | |
| q cp2 | 8.044574 W | |
| q_conv2 | 8.044574 W | |
| q_h2 | 0.145058 W | |
| Q | 5.733902 CFM | |

Temperature of Hand vs Temperature of Convection

Figure 10:
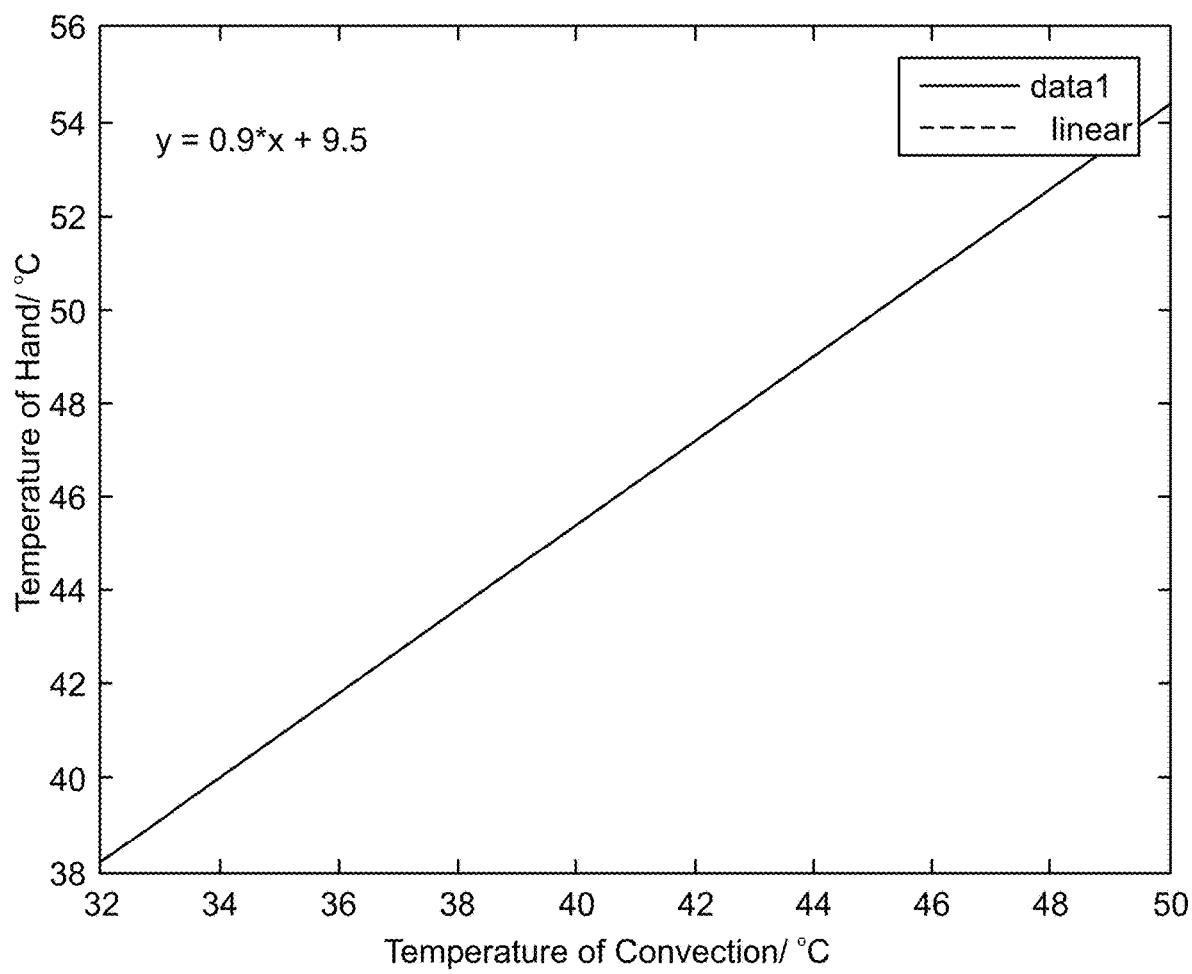
FIG. 10: Graphical representation showing the temperature of the gloved hand as a function of the air temperature at the convection region in the cuff of the glove at an air flow rate of 1 m/s.

The velocity of air flow is held at 1 m/s. FIG. 10 shows the temperature of the gloved hand versus the air temperature at the convection region in the cuff of the glove, specifically the relationship between temperature of convection model and temperature at center of hand. As is readily observed, the temperature of convection substantially influences the system; when the temperature of convection increases from 32° C. to 50° C., the temperature of the hand increases from 38° C. to 54° C. The equation can be roughly written as y=0.9x+9.5.

The CNT sheet is thin and most of the cooling occurs due to convection with air flow up to 1-2 m/s (about 2.2-4.4 MPH), rather than via conduction. The in-plane conduction coefficient for the CNT sheet is about 50 times greater than the through-thickness coefficient. The coefficients depend on the density of the sheet which is controlled by solvent densification when winding the sheet after it emerges from the synthesis reactor, and by post processing such as rolling. Properties of the sheet can be carefully customized for a glove application based on results of both simulation and experimentation.

The simulation analysis demonstrates the importance of sufficient surface area for cooling the glove, which is provided by the large surface area of a CNT sheet and the multiple layers of thin CNT sheet layered into the cuff of the glove. The design of the cooling glove takes advantage of the large surface area of a CNT sheet and maximizes convection cooling. Cooling by conduction, however, alone would require a much thicker CNT layer in the glove. Based on the simulation calculations, radiation heat transfer cooling for this application is small and can be neglected.

Air Flow Rate Q

The air flow rate over the CNT in the glove is: Q=Velocity×Area. Velocity is the velocity of air flow, and Area is the section area of convection model. Velocity is 1 m/s, and Section Area=height×width=0.03 m×0.1 m$^3$/s=5.73 CFM. This shows the air flow rate through the cuff of the glove is about 6 CFM. This air flow can be easily provided by, for example, two small 12 V rechargeable battery-powered fans that can be incorporated into a cooling garment such as a firefighter garment.

Experimental Results Testing In-Plane Thermal Conductivity of CNT Fabric

Figure 11:
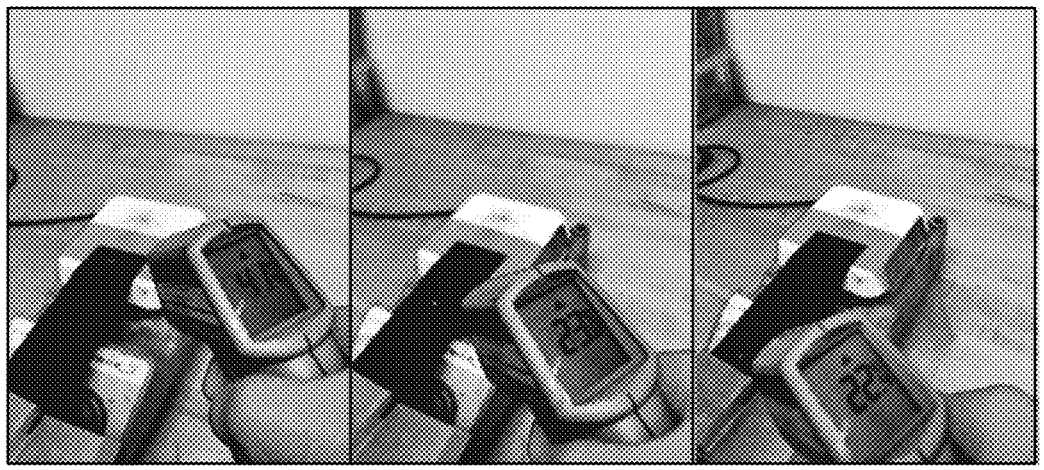
FIG. 11: Pictures of the metric device showing heat transfer testing of a pristine CNT sheet.
Figure 11:
Figure 11:
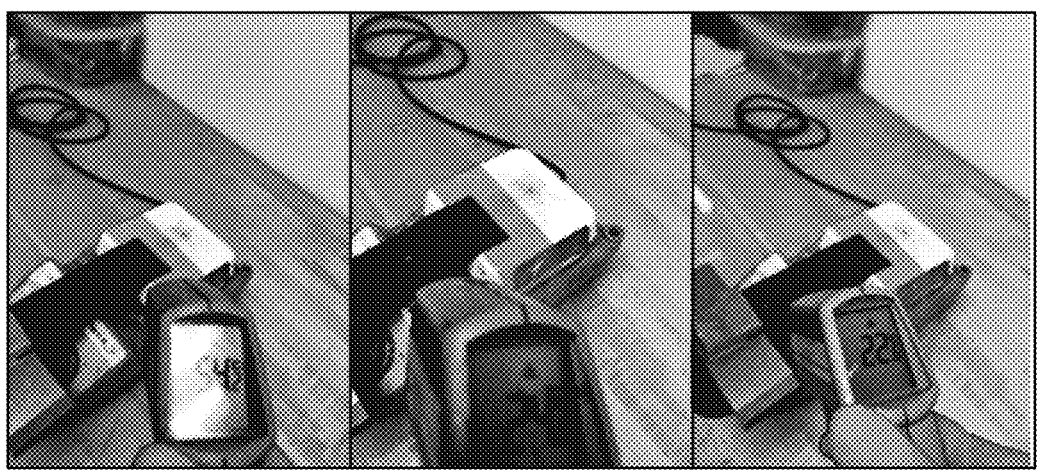
Figure 12:
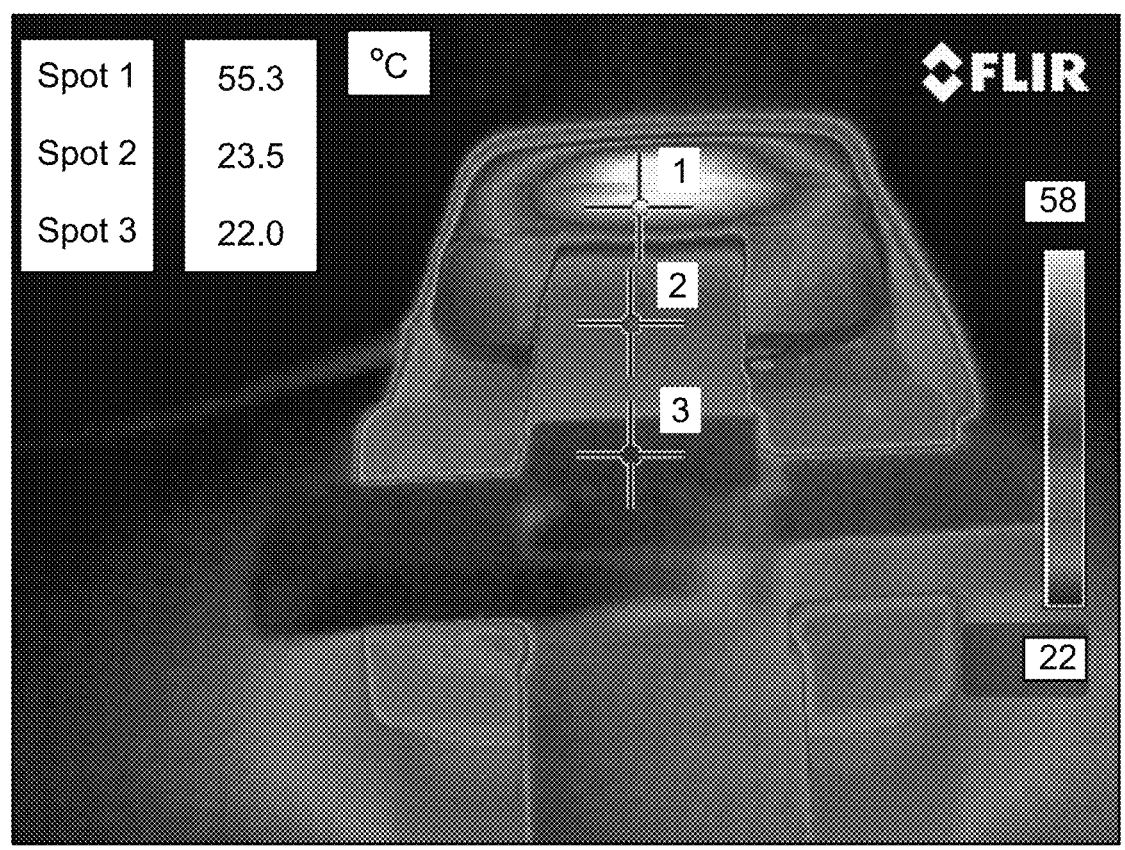
FIG. 12: FIR testing temperature profile of heat transfer of the same CNT sheet used in the experimentation depicted in FIG. 11. The temperature distribution is similar to the results using a laser thermometer (not shown).

A pristine CNT sheet was tested for heat transfer using a hot plate for the heat source and a metal block for the cold sink (at room temperature). The temperature was measured at three locations along the sheet at three different times. The results for the CNT sheet are shown in FIG. 11. The same CNT sheet was thereafter imaged using an IR camera and the temperature profile is set forth in FIG. 12. The Experimental result of the heat transfer of the CNT sheet in the pristine condition indicates that the heat conducted in-plane is low. This is because the cross-sectional area of the thin sheet for conduction cooling is small. The surface area top and bottom for convection cooling of the thin sheet, however, is very high. Thus there is very good cooling by convection while much less cooling via heat transfer to the heat sink. Thus convection cooling of thin sheets and porous fabric may be successfully utilized as the principal cooling mechanism in the glove and thermal garment design.

EXAMPLE 4

This Example sets forth through-thickness thermal testing of the CNT sheet material used in the design of the exemplary glove.

Polybenzimidazole (PBI) fiber is a synthetic fiber with a very high melting point and low thermal conductivity. It has exceptional thermal and chemical stability and does not readily ignite. This material was originally developed for the aerospace industry but has recently been adopted for functional safety and protective gear. Most first responder turn-out gear produced today is about a 60/40 blend of Kevlar and PBI, and is a para-aramid blend. The material is very heavy, stiff and expensive to manufacture.

According to some embodiments, CNT is blended with Kevlar to provide a yarn or fabric that is lightweight, easy to handle and is light weight (with the CNT sheet at tens of microns thick). The CNT fabric is cool to the touch when placed on a cold surface due to its high thermal conductivity. The material is inherently anti-static and anti-microbial, and can be hybridized to have high electrical conductivity. CNT hybrid fabric also has low specific heat which makes it an excellent material for piping and distributing heat. According to other specific embodiments, CNT or CNT-hybrid material may be layered with Kevlar.

An experiment was performed to compare the heat spreading capability of conventional heat resistant material to CNT fabric. A hot air gun was used to heat samples of sheet suspended vertically in air. The distance from the outlet of the gun to the sample was 2 cm. The conventional fabrics size is around 46 cm in length and 10 cm in width. The conventional fabric has two layers, the thermal layer and a soft layer, and the total thickness is around 1.5 mm. The hot air gun is set on a platform and the hot gas blows horizontally. A laser thermometer is used to measure the temperatures of both front and back sides of the sheets. Material 1 and Material 2 are the two different conventional fabrics. The temperature is measured on both the front and back surfaces of the fabric sample at the point of heat application and results are set forth in Table 8. Three tests were performed. The temperature of the CNT sheet was 24% lower on the front side and 37% lower on the back side than the two conventional materials. Notably, the CNT sheet is smaller in area and thinner than the conventional fabrics. Although this test was not a direct comparison due to the different size of the fabrics, the test indicates that CNT sheet spreads heat faster than conventional materials which are thermally insulating. CNT sheet, however, is utilized for different functionality in garments than the thermal insulating fabrics tested. Garments manufactured CNT sheets are utilized for heat transfer/wicking/dissipation and not for thermal resistance.

TABLE 8

Thermal conductivity testing through the thickness of conventional and pristine CNT samples.
Room Temp is 25° C. (all temp in ° C.).

|  | Start Temp | Test 1 | | Test 2 | | Test 3 | |
| --- | --- | --- | --- | --- | --- | --- | --- |
|  |  | Front | Back | Front | Back | Front | Back |
| Material 1* | 25.9 | 144.2 | 136.8 | 144.9 | 124.6 | 142.8 | 127.4 |
| Material 2** | 25.4 | 145 | 137.1 | 143.3 | 128.8 | 142.2 | 129.5 |
| CNT Sheet | 25.1 | 113.2 | 75.5 | 108.4 | 79.8 | 110.6 | 90.2 |

*Material 1: PBI Max 7.0. Typically utilized as an outer shell for firefighter turnout gear; is a 7 oz/yd2 fabric (a typical US fire service weight fabric) having an overall blend of 35% PBI/65% Kevlar. It is reinforced with Kevlar filament yarns.
**Material 2: Glide Ice with PBI G2 facecloth with a blend of Nomex and Lenzing.

EXAMPLE 5

This example demonstrates compositing of CNTH material sheets and CNTH material yarn with other fabrics using different adhesives.

Once the bulk CNT and CNTH material sheets are produced and densified, the resulting sheets may be composited (laminated or joined/blended) with other fabric materials in order to create fabric yardage. CNT/CNTH material sheets composited onto knit, woven, and nonwoven fabrics will provide a fabric exhibiting both the positive and negative features of both. Fusion/blending methods are listed in Table 10 and provide a menu of design and engineering opportunities and constraints. Depending on the intended end-use, composited fabrics may be tailored to fit product needs. Each combination includes three variables: a CNT/CNTH material (sheet or yarn), a second fabric (knit, woven or nonwoven) and a specific bonding process (lamination, entanglement, stitching, spinning, etc); that provide a wide variety of composites having an array of functional properties. Desired properties may be defined then prototyped for a particular end-use, then user-tested (e.g. functionality, performance, durability and safety). Some post processing methods may be needed depending upon the end use of the product and the properties that must be exhibited. Exemplary post-processing methods that may be used to improve/alter the properties of the fabric include spinning the CNT/CNTH sock into yarn, drawing the sock into sheet, stretching the fabric for alignment, densifying the material using solvent, coating the material with a polymer, for example to control shedding, cleaning the material, acid treatment to increase electrical conductivity, and rolling.

TABLE 10

Methods compositing CNT and CNTH materials (sheet and yarn) with other fabrics.

1. Compositing of CNT + CNTH sheet with conventional fabrics using lamination with chemical bonding agents, mechanical entanglement or thermal bonding.
2. Compositing of CNT + CNTH sheet with existing nonwoven textiles using needle-punching, entanglement.
3. Integration of CNT + CNTH sheet and/or yarn into a nonwoven fabric web during production.
4. Plying drawn CNT + CNTH yarn with functional fibers to form a composite/blended yarn.
5. Application of CNTH material onto conventional fabrics using stitching, machine embroidery or quilting.
6. Integration of CNT + CNTH yarns in to the fabric structure via knitting and weaving.
7. Introduction of other low/high temperature resistant nanoparticles into the gas phase The compositing methods set forth in Table 10 are selected based on compatibility with CNT/CNTH material. Exemplary methods include laminated composites using thermal bonding, chemical adhesion and mechanical entanglement, Table 10: #1-3, which are inexpensive and are rapidly produced. By integrating CNTH yarns into the fabric structure via weaving, knitting, embroidery and machine stitching enable functionalized CNTs to become an integral part of the fabric structure; Table 10: #4-6. According to some embodiments, CNT/CNTH materials are blended with Aramid, Aerogel, Flurocarbon, Melamine, Nomex, Polybenzimidazole (PBI) or PBO Zylon nanoparticles with during growth in the synthesis reactor.

For testing, the mechanical and chemical properties of the components including fabric, CNT, and the adhesives' properties are all considered. Bonding affinity between the CNT sheet and a variety of other fabrics is tested.

Method 1: integrating pristine CNT sheets and yarn into conventional fabrics using commercially available thermal and chemical bonding agents through lamination (Table 11) Bonded fabrics are stronger and more durable than their non-bonded equivalents; this is especially true of delicate, loosely woven or knit fabrics as well as webs like nonwovens such as the CNT sheet configuration. Bonded fabrics are used primarily for upholstery, automotive applications, and some bonded knits are available for functional and consumer textiles and apparel where composite layers are needed, (e.g. first responder garments, waterproof/breathable membranes, etc.) The example demonstrates compositing a high-throughput CNT sheet onto existing fabrics exemplified by knit, woven and nonwoven fabrics.

Each fabric material was bonded to CNT sheet with a variety of commercial adhesive bonding agents. Each of nine adhesives across five application categories (e.g. knit fusible interfacing, adhesive tape, nonwoven web, liquid adhesive and aerosol adhesives), were tested with each of the five select fabrics which include two knit fabrics, one woven fabric with wicking capabilities, and two nonwovens.

Five unique fabric substrates were used in the bonding tests. These fabrics were selected for their range of properties including fiber composition, fabric structure and finish, as listed in Table 11, (a). The samples include two knit fabrics, one woven fabric, and two nonwoven fabrics. Fabrics were of synthetic polymer fiber content: Polyester (PL), Polyamide/Nylon (PA) and Spandex/Lycra elastane (EA) in various blended ratios. Each of the synthetic fibers are capable of re-forming using melt-spun extrusion, bicomponent and electro-spinning processes. Synthetic fibers are inherently hydrophobic, and can be easily printed using sublimation transfer inks. They are also thermoplastic. No fabrics with natural cellulosic or protein fibers were included due to the propensity of natural fibers to burning/decomposing and their overall weak properties. Each of the five fabrics were combined with Pristine CNT sheets grown using the continuous gas-phase pyrolysis method using nine different commercially available adhesives and bonding agents (Table 11 (b)) to create the first composite CNT fabric samples. A range of adhesives were selected to represent both thermally-activated and contact-based bonding agents delivered in solid, liquid/gel and aerosol form in order to test the affinity of the adhesives to both the fabric and the CNT sheet in each sample.

TABLE 11

Listing of specifications for; (a) fabric samples, and (b) bonding agents/adhesives used in composite lamination tests with CNT sheet.

| (a) Fabric Samples (Description/ Fiber Content /Weight) | (b) Bonding Agent/Adhesive (Description/Material Content/ Bonding method) |
|---|---|
| Fabric #5: Tricot Warp Knit Two-way crossgrain stretch Polyester (PA) 85%, Spandex (EA) 15% 222 g/sqm | Adhesive #1: Fusible Fabric Interfacing-Tricot Knit Thermally activated |
| Fabric #6: Tricot Warp Knit Sensitive B. Feel by Eurojersey. No pill, eco-friendly, water-wicking, 4-way, Bicomponent microfiber Nylon (PA) microfiber 69%, Spandex (EA) 31% 140 g/sqm | Adhesive #2: Thermal PA Web-Nonwoven Heat Bond Lite Thermo-Web Thermally activated |
| Fabric #7: Performance Plain Weave 4-way stretch Polyester (PL) 91% Spandex (EA) 9% 208 g/sqm silver treated for bacterial protection waterproof treatment-passed rain test By Evertek | Adhesive #3: Adhesive Glue Tape Tanners Bond Contact and Pressure |
| Fabric #8: Stretch + Recovery Nonwoven Hydroentangled and heal fused by Hollingsworth + Vose PA 80% melt blown fiber web with embedded EA mono filament 70-100 g/sqm | Adhesive #4: Liquid Cement Loctite Fabric Adhesive Chemical adhesive: 24 hour curing time |

TABLE 11-continued

Listing of specifications for; (a) fabric samples, and (b) bonding agents/adhesives used in composite lamination tests with CNT sheet.

| (a) Fabric Samples (Description/ Fiber Content /Weight) | (b) Bonding Agent/Adhesive (Description/Material Content/ Bonding method) |
|---|---|
| Fabric #9: Calendar-bonded Nonwoven PL 100% Weight Unknown | Adhesive #5 Water-based Liquid Glue Sobo Fabric Glue (air cured) 48% PolyVinyl Acetate Copolymer Emulsion, 5% Propylene Glycol and 47% water. Adhesive #6 FABRIC: Fusible Tricot Knit Double Interfacing Thermally Activated Adhesive #7 NONWOVEN WEB: Stitch Witchery: Polyamide/nylon fusible bonding web (Heat) Adhesive #8 AEROSOL: Spray Adhesive Thermally activated Adhesive #9 AEROSOL: Spray Adhesive Direct (Pressure) |

Figure 14:
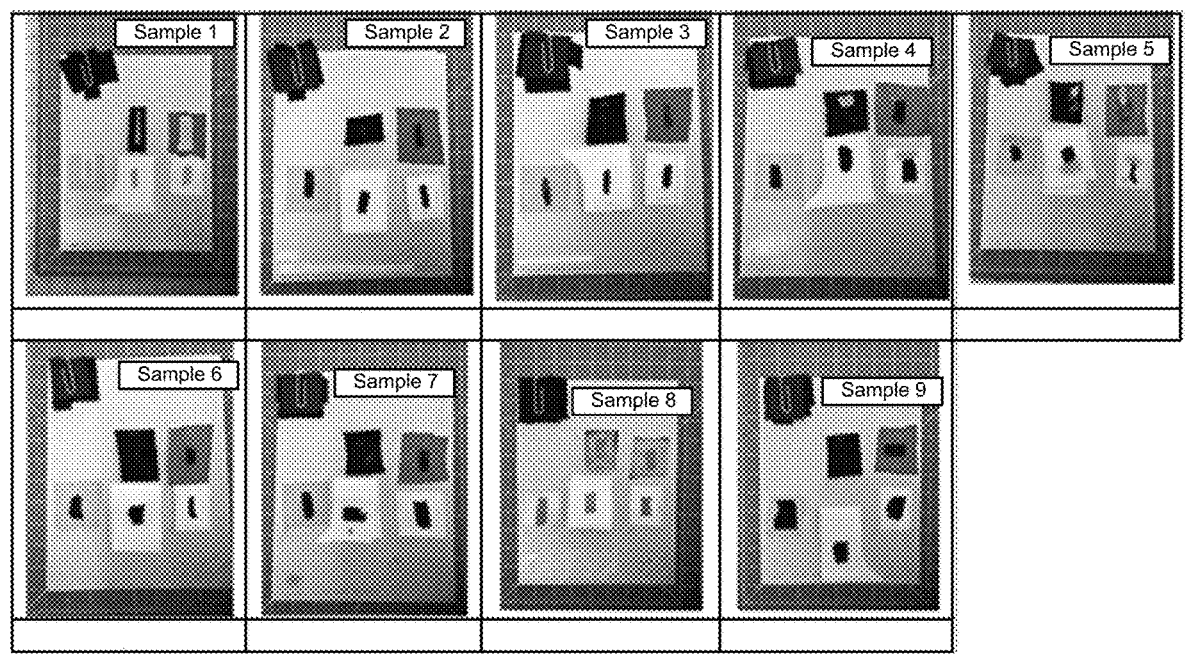
FIG. 14: Photographs of bonding test results using commercial adhesives, samples 1-9: (1) fusible tricot interfacing, (2) heat bond thermo web, (3) tanners bond adhesive tape, (4) stitch witchery, (5) web bond tricot knit, (6) Water based sobo fabric glue, (7) Loctite epoxy cement, (8) Thermally activated aerosol bonding agent with nonwoven laminate, (9) aerosol contact bonding agent. Samples 1-4 use heat and contact activated adhesives in fabric interfacing and tape form; samples 5-7 use liquid contact activated adhesives; and samples 8 and 9 use aerosol form heat and contact activated adhesives.

The CNT sheets and fabric swatches were trimmed to size, considering the alignment of the grainline direction and the amount of stretch in each fabric. CNT sheets were cut, adhesives applied. Layers were then combined using a Singer ESP2 model electronic heat press. The press delivered even pressure (100 psi) across the surface, and was set to 187° C. for variable time periods as per the application instructions for each adhesive. The CNT material was either topically applied to the fabric using heat and/or pressure to activate the adhesive. The CNT material in adhesive sample 1, FIG. 14, and adhesive sample 8, FIG. 14, was laminated between two fabric substrates, depending on the adhesive application specifications. Overall, FIG. 14 sets forth 9 composited samples: (1) fusible tricot interfacing, (2) heat bond thermo web, (3) tanners bond adhesive tape, (4) stitch witchery, (5) web bond tricot knit, (6) Water based sobo fabric glue, (7) Loctite epoxy cement, (8) Thermally activated aerosol bonding agent with nonwoven laminate, (8) aerosol contact bonding agent. The adhesives of samples 1-4 are categorized as heat and contact activated adhesives in fabric interfacing and tape form; samples 5-7 utilize liquid contact activated adhesives, and samples 8 and 9 utilize aerosol form heat and contact activated adhesives.

For standardization of comparison, the pristine CNT sheet was used without any chemical functionalization. The CNT sheet was partially densified using alcohol. No rolling or stretching or post processing was done to the CNT sheet.

As noted above, samples 1-3 utilize adhesives that are applied in a dry, solid tape form. The following discussion of samples is in view of FIG. 15.

Sample 1: Fusible tricot knit interfacing has a base substrate of polyester knit fabric that offers slight stretch in both directions and a thermal 17 mesh polyamide paste dot coating that is applied to one side. In this composite, the adhesive was applied back down, sandwiching the CNT sheet sample in-between and pressed with 100 psi pressure even across the press surface at 187 degrees Celsius for 10 seconds. The layers bonded well to the CNT sheet and to the fabric. For fully laminated layers, a double sided adhesive applied between the fabric and CNT sheet is needed. This method creates a composited system with a protective layer on the outside, and a potentially breathable layer on the inside of the fabric, making this method useful for applications where wicking and breathability are needed.

Figure 15:
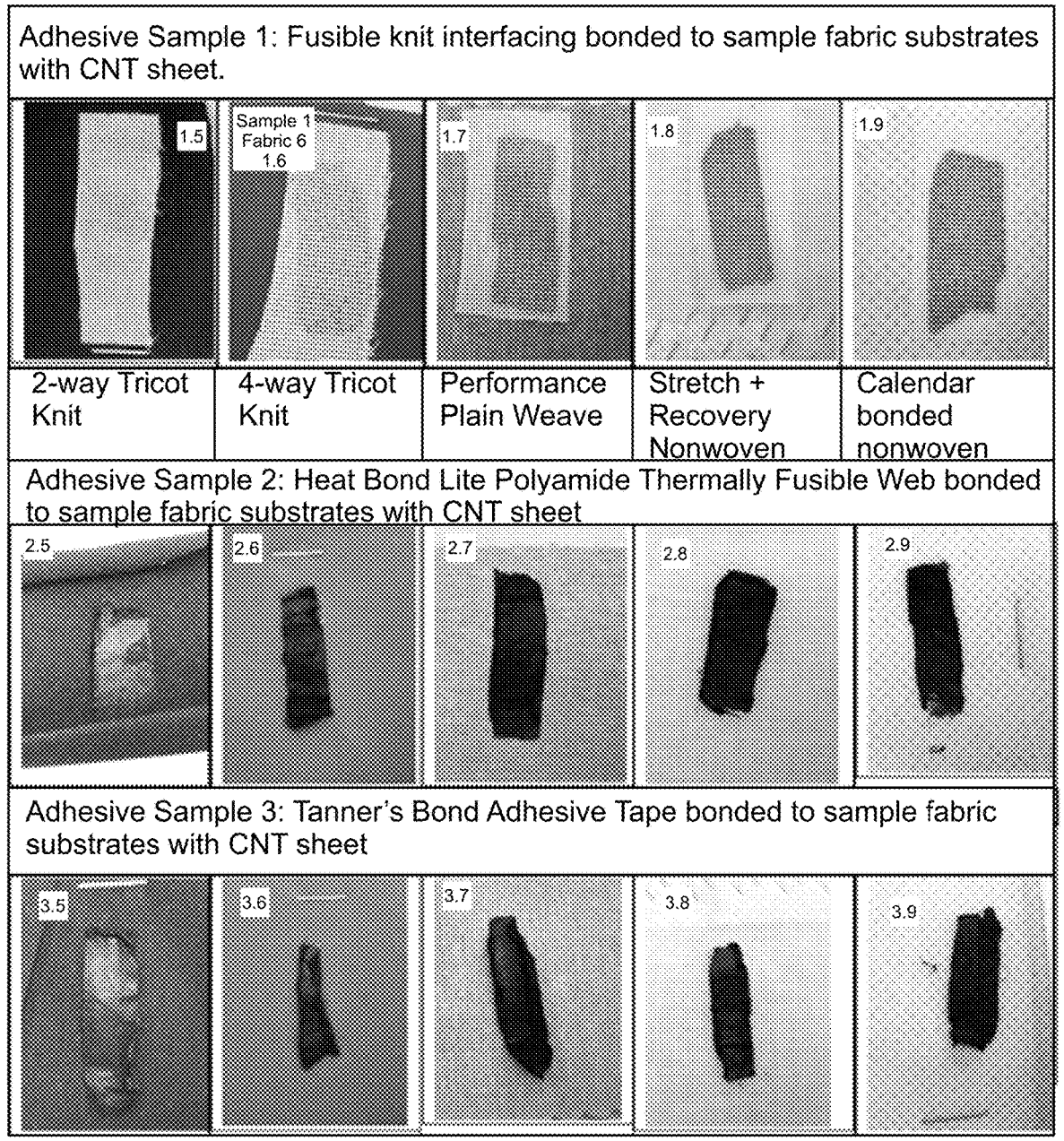
FIG. 15: Photographs of 9 specimens of CNT/CNTH MATERIAL and fabric composites made utilizing various categories of fabric and of adhesives.
Figure 15:
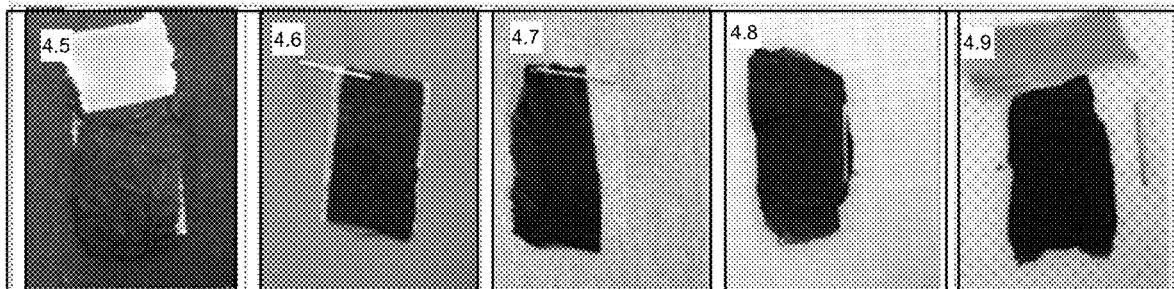
Figure 15:
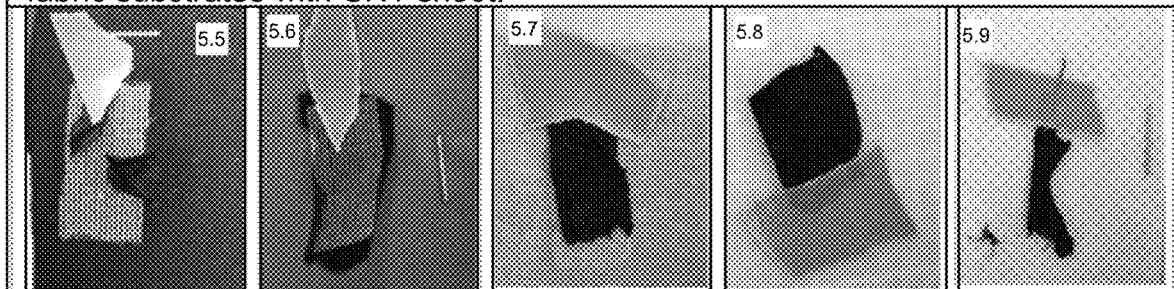
Figure 15:
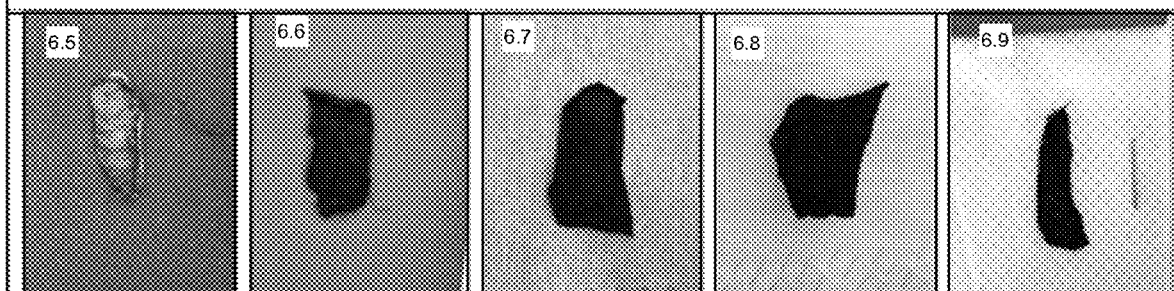
Figure 15:
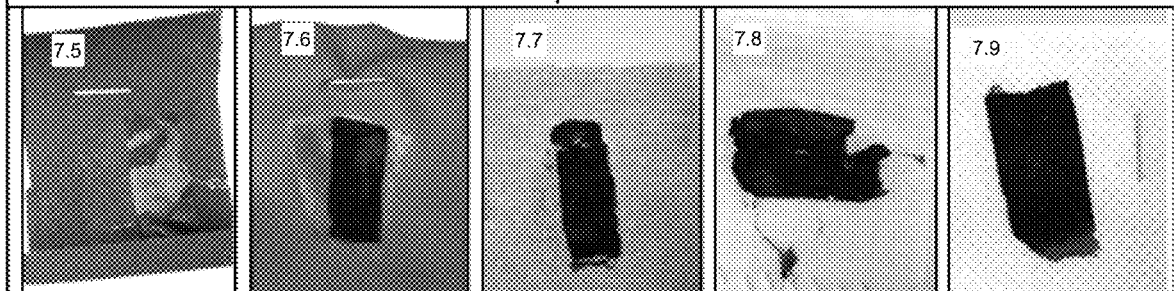
Figure 15:
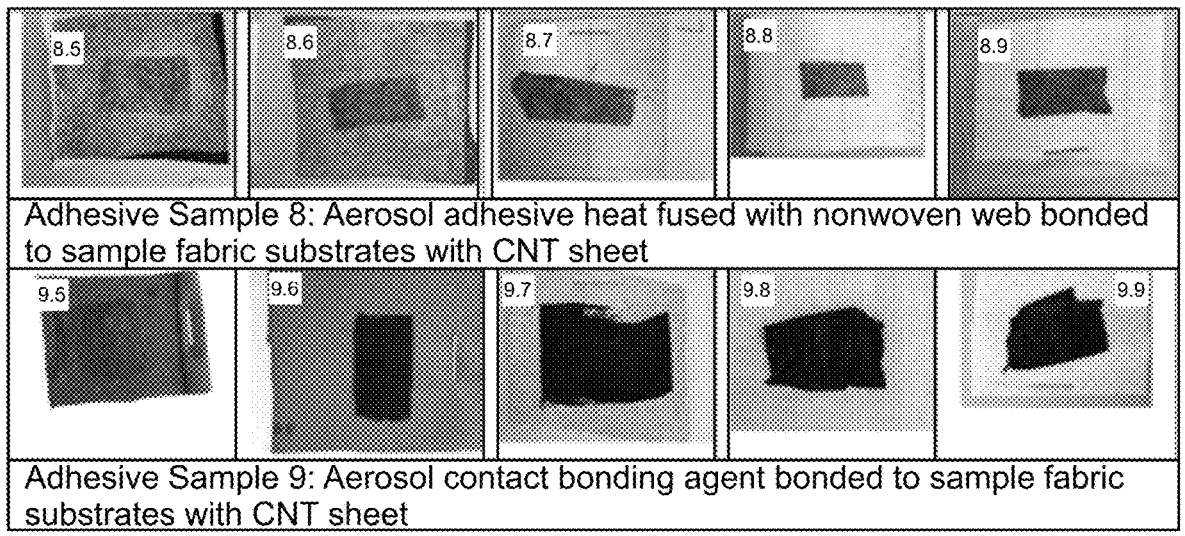
Figure 18:
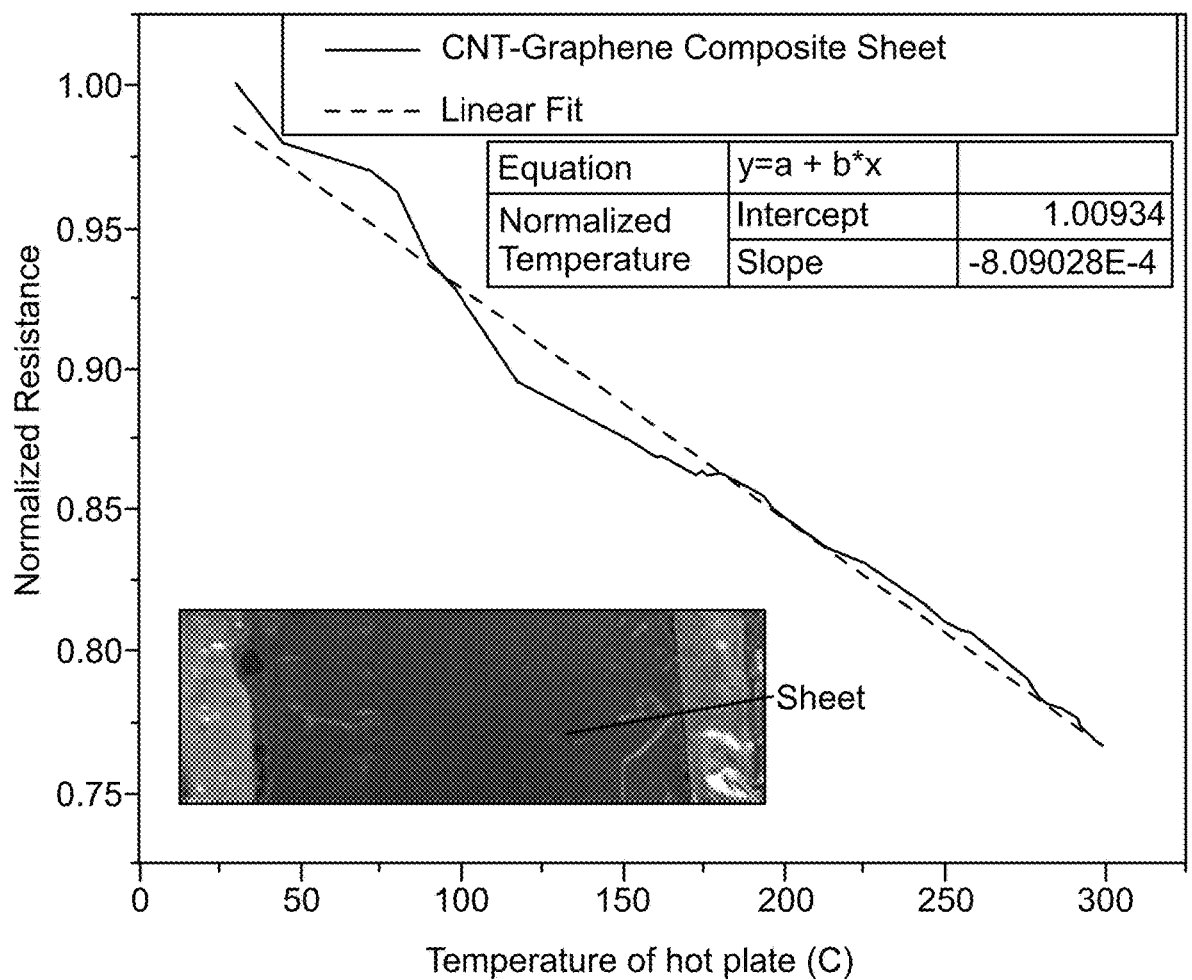
FIG. 18: Graph showing response of the CNT-graphene sheet temperature sensor.

Sample 2: The Heatbond Lite is a thermal adhesive web. This adhesive was applied with heat for 5 seconds using 100 psi pressure even across the press surface at 187 degrees Celsius to secure the tape to the fabric substrate. After 10 seconds of cooling, the paper backing was removed and the CNT sample was applied and heat pressed for 10 more seconds. This method bonded the CNT to all five fabrics firmly, however worked most effectively on the low stretch woven (FIG. 15, 3.6) and bonded nonwoven fabric (FIG. 15, 3.9).

Sample 3: Tanner's Bond contact adhesive tape was applied with 100 psi pressure but does not require heat. This adhesive is derived from ethelyne-vinyl acetate and bonds to the material like glue. This adhesive created a stronger bond than the thermal web and was effective to bond the CNT sheet with all five fabrics, however more testing is needed to determine if this adhesive type would stand up against wear, heat and laundering. This adhesive changed the fabric hand, and prevented stretch in the applied area, but created a strong bond.

Samples 4-5 utilize two adhesives that are both a type of polyamide fusible web with a single sided adhesive that bonded well with the CNT sheet as a laminate layer.

Sample 4: Stitch Witchery is a spun and dry laid polyamide fusible web that melts bonds to the composite materials with heat, steam and pressure. This adhesive was combined between with the CNT sheet and fabric using 100 psi at 187 degrees Celsius for 60 seconds. This material produced a weak bond the fabrics, but attached well to the CNT sheet. More time and heat are needed to melt the polyamide web to the layers for true lamination. This was the least effective method across all adhesive samples.

Sample 5: This sample is a fusible tricot knit stay tape with a with a weft insertion yarn for added stability. Warp insertion interfacings can be fused at lower iron temperatures making them compatible with fabrics such as silks and microfibers that cannot take higher temperatures. This sample worked well to bond with the CNT sheet, but not with the fabric substrates as the adhesive was only on one side of the interfacing. An interfacing fabric is a construction material that lies between layers of fashion fabric. Interfacings add shape, strength, and body to the garment. Most garments require some type of interfacing fabric for inner stability to support the fashion fabric and add definition, while not increasing the size of the garment. Interfacing reinforces areas subject to flexure and stress and helps a garment maintain its shape. This is made of 100% polyamide/nylon. These would work well with the CNTH material sheet as a water and air permeable stabilizer. Both tests were successful in bonding the fusible web to the CNT sheet. The knit interfacing was more flexible and was more stable than the nonwoven web, however it would be more expensive to produce.

Adhesive samples 6 and 7 utilized liquid adhesives that chemically bond without heat. These liquid adhesives were more difficult to control than solid and tape adhesive forms, but their viscosity could be helpful if applied as a paste or printed onto the surface in a controlled pattern.

Sample 6: was composited using Sobo™ fabric glue, a commercially available water based glue. The material is non-flammable and nontoxic, but is water soluble, which could be problematic in applications where repeated washing and solubility is a factor (most clothing applications). This adhesive bonded well to all substrates because the glue bonded firmly to the CNT and fabrics. This material requires 4-6 hours to dry/cure. The material remained flexible, but stiffened the hand of the fabric.

Sample 7: composited using Loctite™ vinyl fabric cement, which contains 70% methyl ethyl keytone and 20% isocyanate terminated polyurethane. This adhesive is polymeric and creates a watertight bond, but is not safe in high temperature applications. The adhesive requires a 24 hour curing time. It produced a very strong but inflexible bond with all fabric substrates. There are also concerns for the chemical toxicity of this type of material, especially if the resulting fabric is to come in contact with human skin.

Composited samples 8 and 9 used heat activated and contact spray-on bonding agents/adhesives.

Sample 8: this sample utilized a heat activated spray adhesive and non-fusible nonwoven barrier layer. CNT sheet was laminated between two sheets by applying the spray adhesive on both sides. This method is effective for quickly coating and compositing three layers of material. The outer web is a polyester nonwoven interfacing with no adhesive applied to it. It was used as a barrier to prevent the adhesive from sticking to the heating element. This proved to be an effective way to laminate the CNT sheet and stabilize the material. The spray-on methods were effective for all materials except for the stretch and recovery nonwoven, which did not effectively bond in either sample 8 or 9. The CNT sheet fused well to the backing and fabric. There was very little change in the fabric hand, or its properties of flexibility. The laminated nonwoven webbing prevented stretch and this material, although creating a stabilizing barrier, rips when strained.

Sample 9: Aerosol contact adhesive is directly sprayed on and activated by pressure alone without heat. Samples bonded fairly well. This material was sprayed onto the fabric substrate; CNT sample was laid down and pressed with 100 psi pressure with no heat to activate contact. These samples provided a simple double layer sample that can be easily bonded with no need for heat.

Across all of the adhesive tests, there were several fabrics that reacted best with the adhesives: the high performance woven fabric and the thermally bonded nonwoven fabric. Polyester and polyamide nylon thermal adhesive interfacings seem to bond well with the fabrics as a result of their thermoplastic properties and low melting points. Solid interfacing and web type adhesives allow for more stretch, breathability, flexibility, and less stiffening than liquid cements due to the localized contact points of the adhesive with the CNT and fabric. The knit or web fabric layer of the interfacings provides a water and air permeable stabilizer that may be useful in filtration applications. Liquid adhesives create a coating that bonds well with the CNT sheet and fabric, however cure time will extend production time, and quality and longevity considerations like laundering and exposure to heat and possible toxicity of exposure to skin when heated, create potential issues to fabric production and application. The application of the liquid and aerosol bonding agents are more difficult to control unless using a printing method like screen-printing, stamping or stenciling to apply the adhesive to the substrate in a controlled and localized manner. In our tests, the liquids created a strong bond, however their thicknesses and impermeable coating did not provide for stretch or breathability through the composite material, which could be problematic in applications where these properties are needed. Aerosol thermal and contact adhesives have the best of both the liquid and fusible categories; however, application is difficult to control.

CNTH material laminates are suitable for low cost, producible, breathable and stretchable CNTH fabric applications. In some heat sensitive applications, adhesive lamination will not be the most effective application. For high temperature applications, such as turnout gear, melt/burn point of the adhesive and fabric is a consideration, as well as chemical release during heating. A non-flammable, heat resistant polymer based adhesive or stitching method should be used in this type composite special application fabric. Furthermore, the fabrics themselves each reacted differently to the laminate testing.

EXAMPLE 6

This example demonstrates stitching of CNT yarn into fabric to join fabrics together and to provide electrical connections in garments and for composite materials.
Sewing CNT-Coated Fiber into U.S. Army Fabric The stitching of any pattern design with CNT yarn onto fabric proves to be a viable and innovative method of fabricating wearable electronics. This method utilizes textile production techniques to incorporate smart functionality of the CNT/CNH material into fabric. The CNT fiber in this experiment was stitched into the Army fabric with an automated embroidery machine, Brother LB6800PRW. A method developed for making a CNT sheet/Dyneema™ polymer composite yarn is described.

With the use of the thermoplastic polymer, CNT sheets can be permanently adhered to very strong fibers such as Dyneema™ to create a multifunctional bicomponent fiber. This can increase conductivity thus creating a truly high strength and light weight conductive fiber. This fiber can be spun into thread for sewing. The resulting thread provides multiple design options and performance properties in one: The ability to engineer the embroidery design/circuitry using machine sewing/automation allow for nearly unlimited customization of the CNT/Dyneema™ thread pattern. The thread can also be woven or knitted into the fabric structure, creating an entirely new textile that utilizes the lightweight strength that the combination affords. Optical images of Dyneema™ polymer fiber, Dyneema™ coated with CNT sheet, and a copper plated CNT/Dyneema™ composite are shown in FIGS. 16A-C respectively.

The load bearing capacity of the CNT Sheet/Dyneema™ composite yarn was compared to that of the pristine CNT yarn. Higher load carrying capacity of the composite yarn made the stitching process very efficient, and at the same time versatile pattern designs can be stitched on the fabric, allowing for an opportunity to customize/engineer the design of the embroidery based on a specific product constraints or needs. For stitching on fabric, a proper pattern is required, and must be designed. While optimizing the stitching process, delamination of the CNT sheet from the Dyneema™ yarn was observed and can be seen in FIG. 17A. The delamination was due to the tension of the top thread on the bottom thread during sewing. However, tweaking the manufacturing process of CNT Sheet/Dyneema™ composite yarn eliminated the delamination. As shown in FIG. 17B, there is no delamination of the CNT Sheet/Dyneema composite yarn in the stitched pattern. Moreover, with this improvement in the yarn fabrication, complex designs can be now easily stitched on the Army fabric for wearable electronics such as antennas and sensors.

EXAMPLE 7

This example illustrates construction of a prototype CNTH material glove. FIG. 20A shows the typical construction of a glove designed for heat resistance and abrasion resistance. The glove has two layers with a cuff. The inner layer is a soft layer that contacts the hand. The outer layer is a tough material (leather and synthetic material typically) that protects the hand from heat and burning, abrasion, and penetration. To improve cooling and provide other multifunctional properties such as electrical shielding and increased puncture resistance, the inventive glove has a CNTH material layer inserted between the outer abrasion resistant layer and the inner layer so the CNTH layer is not against the skin. The CNTH fabric comprises a pristine CNT outer layer, a CNT-GAC material center layer, and another pristine CNT outer layer to constrain the particles in the hybrid layer. Adding the CNT layer increases the thermal resistance from the outside of the glove (from the environment) to the hand which will slightly reduce the temperature of the hand. The CNT layer will also spread the heat throughout the glove due to the high thermal conductivity of CNT material, and the CNT layer will also conduct heat to the cuff of the glove where it will be dissipated by convection. Heat spreading and convection cooling provided by the CNT fabric reduces the average temperature of the glove in contact with the hand.

With reference to FIG. 20A-D, CNT pristine and CNT-GAC fabric is inserted between the outer abrasion resistant layer and the inner layer that is comfortable for the hand (FIG. 20D). The CNT fabric layer increases the heat resistance of the glove (i.e. keeps the hand cooler), spreads heat from a hot spot throughout the glove, and dissipates heat by convection in the cuff. The CNT layer can be fused (bonded) to the soft inner layer or stitched to the inner/lining layer depending on the application requirements. It is contemplated that multiple horizontal CNT hybrid layers can be added to customize a glove to have increased flame retarding functionality, increased thermal conductivity (cooling), chemical filtering, puncture resistance, and electrical shielding or conduction, in critical areas of the glove. FIG. 20A shows an inner lining layer and an outer layer of a representative commercial glove used for heat and burn resistance; FIG. 20B shows a CNT sheet with pristine and/or hybrid layers as desired in the glove design; FIG. 20C shows CNT fabric placed over the inner liner before fusing or stitching and before cutting slots between the fingers and before covering the thumb; FIG. 20D shows the assembled glove with inner liner, CNT fabric, and outer tough fire resistant layer. The cuff is folded up to show the CNT layer and the inner (white) layer. Another assembly approach not pictured involves pieces of the CNT/CNTH layer being joined to form the inner/cooling layer. For example, a thin strip of CNTH-GAC is used on the fingers running to a CNT multi-ply material in the cuff of the glove. Note that for mass production a more efficient manufacturing approach is to composite the inner (white) fabric and the CNTH fabric first, using different thickness and CNTH hybridization as optimal for performance, and then carry out the cutting and stitching to form a combined inner white and CNTH layer that is inserted into the outer layer per normal practice.

For illustration, only one layer of CNT fabric (about 20 microns thick, 0.02 mm in this specific embodiment) is shown. Up to 10 or more layers could be used to increase the strength of the layer, and increase convective cooling in the cuff of the glove. The thickness of the outer layer of the glove (thickness varies depending on area of glove) is about 1.37 mm (which is 68 times thicker than a single CNT layer); and the thickness of the inner lining (thickness also varies depending on area of glove) of the glove is about 0.69 mm (which is 34 times thicker than a single CNT layer).

Thus adding multiple CNT layers does not significantly affect the mass or bulk of the glove.

EXAMPLE 8

This Example tests and compares properties of three different fabrics. Material 1 is PBI Max 7.0, which is a traditional outer shell material for firefighter turnout gear. This fabric is 7 oz/yd$^2$ (a typical US fire service weight fabric). The overall blend is 35% PBI/65% Keviar®. It is reinforced with Keviar® filament yarns. Material 2 is Glide Ice with PBI G2. The facecloth of Glide ice is a bluish sliver color and contains only Nomex/Lenzing. Material 3 is a CNT sheet according to embodiments of the invention. A pristine sheet made by gas phase assembly is tested. This sheet is not aligned or densified by post processing.

The fabric samples are 2.1 in wide and 20 inches long. The thickness of material 1 is about 0.188 mm, the thickness of material 2 is about 0.183 mm, and the thickness of the CNT fabric is about 0.015 mm. The exact thickness of fabric depends on the pressure used for the Vernier caliper. Note, however, the thickness of the CNT fabric is one order of magnitude less than the thickness of the other fabrics.

Figure 13A:
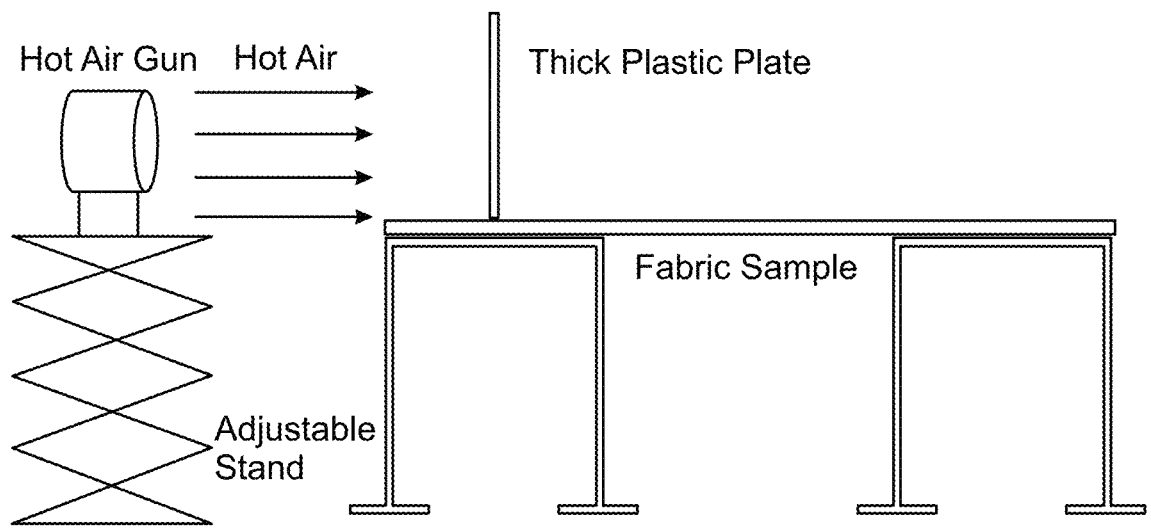
FIG. 13A-D: Exemplary material samples are tested and compared to CNT fabric to compare heat spreading.
Figure 13B:
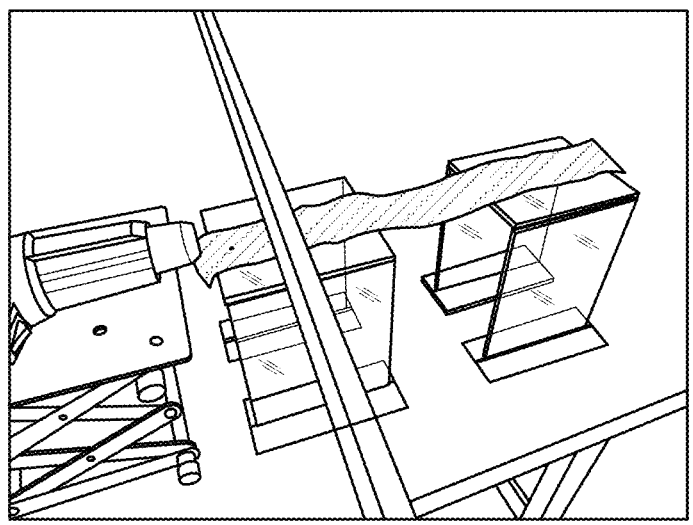
Figure 13C:
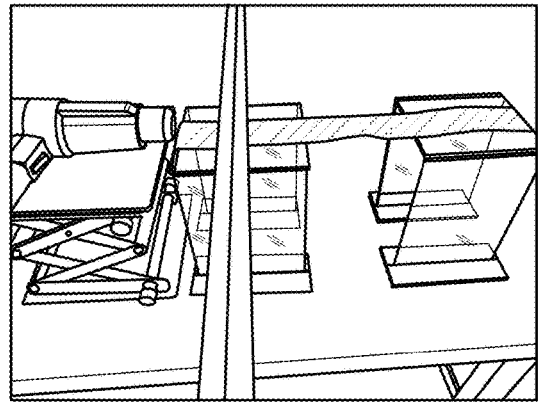

Heat transfer in the long direction of the fabric is tested. The temperature of the fabric is measured at six points along the length of the fabric, all samples are 20 inches long. The distance between each point is 3 in. A laser thermometer is used to make the temperature measurements. A thermocouple is used in select cases to verify the measurement of the thermometer or to measure the temperature directly in front of the heat gun as the IR radiation from the heat gun confused the laser thermometer. Testing of fabric for in-plane heat conduction is shown in FIG. 13A-D. Each of the three fabrics is tested three times for statistical significance. FIG. 13A shows a schematic of the Setup for testing in plane thermal conductivity, and FIG. 13C shows the in-plane testing of CNT fabric.

A thick plastic plate is used to prevent hot gas passing along the sample and influencing the results of the experiment. There are six points on the fabric sample, and the laser thermometer is used to measure the temperatures. Room temperature was 25.1° C. Measurements are given in Table 12.

TABLE 12

Temperature Along the Length of the Fabric

| Point | 1 | 2 | 3 | 4 | 5 | 6 |
|---|---|---|---|---|---|---|
| Material 1- | 140.1 | 51.9 | 40.2 | 39.1 | 38.8 | 36.3 |
| Quantum 4i | 142.2 | 50.3 | 39.9 | 39.3 | 38.6 | 36.4 |
|  | 141.7 | 51 | 39.7 | 39.4 | 38.6 | 36.3 |
| Average | 141.33 | 51.07 | 39.93 | 39.23 | 38.68 | 36.33 |
| Material 2- | 131.2 | 40.9 | 36 | 35.5 | 34.8 | 33.9 |
| Glide w/PBI | 130.9 | 40.1 | 35.9 | 35.6 | 35 | 34.2 |
| G2 | 133.5 | 40.2 | 35.9 | 35.1 | 34.7 | 34.1 |
| Average | 131.9 | 40.4 | 35.93 | 35.4 | 34.83 | 34.07 |
| CNT Sheet | 152.8 | 60.1 | 46.5 | 42.1 | 37.9 | 35.6 |
|  | 152.1 | 60.8 | 47.2 | 43.5 | 36.3 | 35.6 |
|  | 152.4 | 61.7 | 46.8 | 42.9 | 37.1 | 35.3 |
| Average | 152.4 | 60.87 | 46.87 | 42.83 | 37.1 | 35.5 |

Figure 13D:
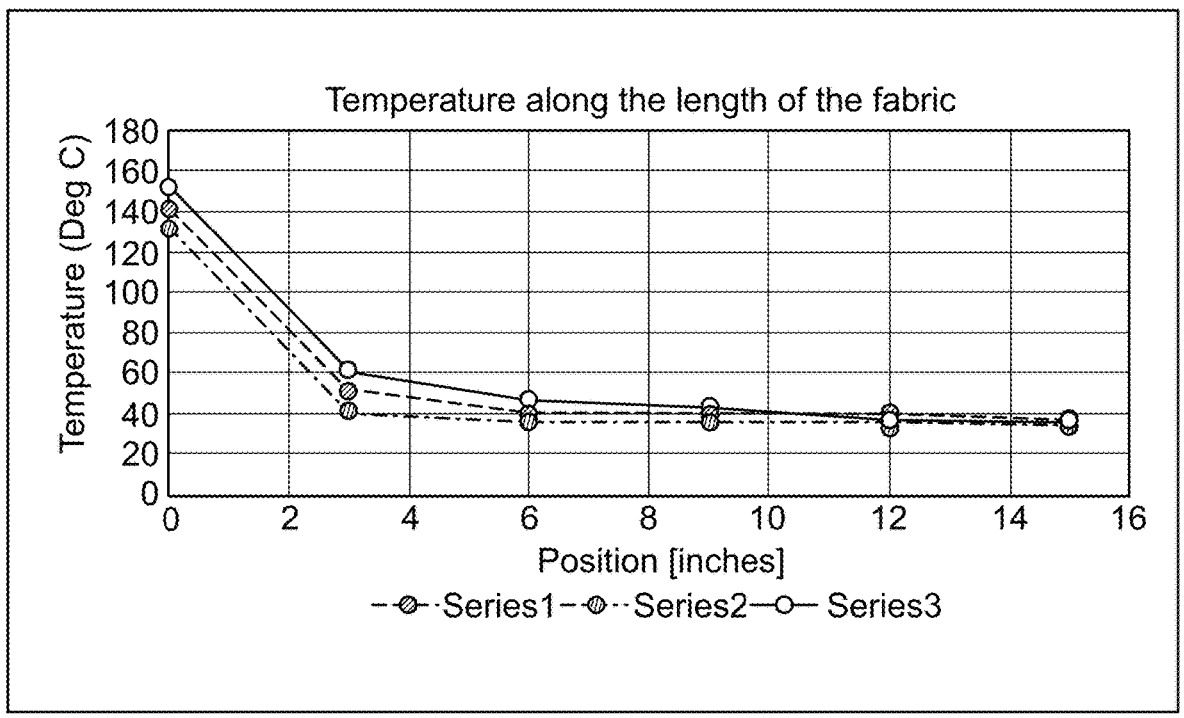

The average data is graphed and set forth as FIG. 13D.

The data set forth graphically as FIG. 13D shows that the three fabrics behave similarly. This indicates fast cooling by convection. Thicker samples (composited or layered samples as in the actual garment) would be needed to test cooling by conduction. The CNT fabric is at a higher initial temperature than the other fabrics possibly because the CNT fabric is absorbing radiant heat from the heat gun. The CNT layer will be in the interior of garments and this effect would not occur in the actual garment.

EXAMPLE 9

Figure 21A:
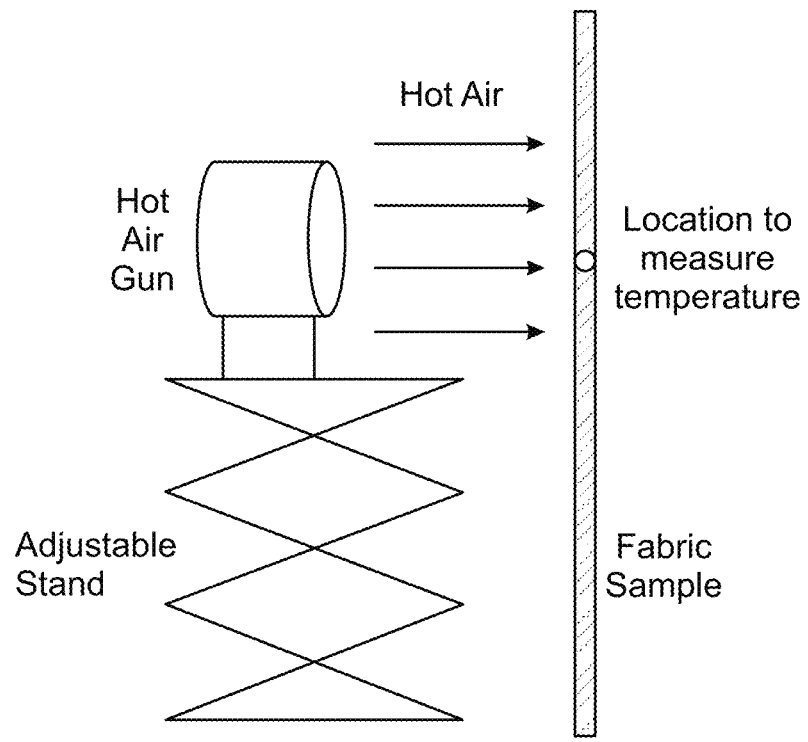
FIG. 21A-C: Shows the experimental setup for testing of the materials defined in Example 4 in a through-thickness heat transfer test.
Figure 21B:
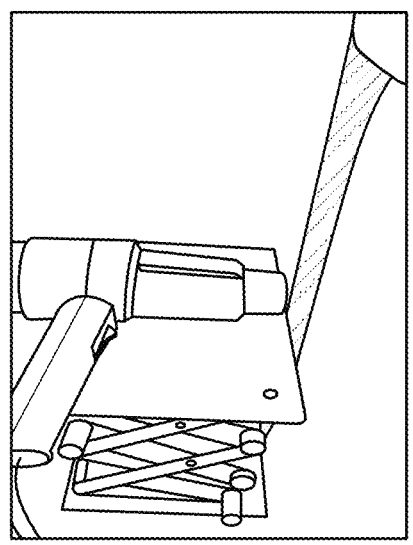
Figure 21C:
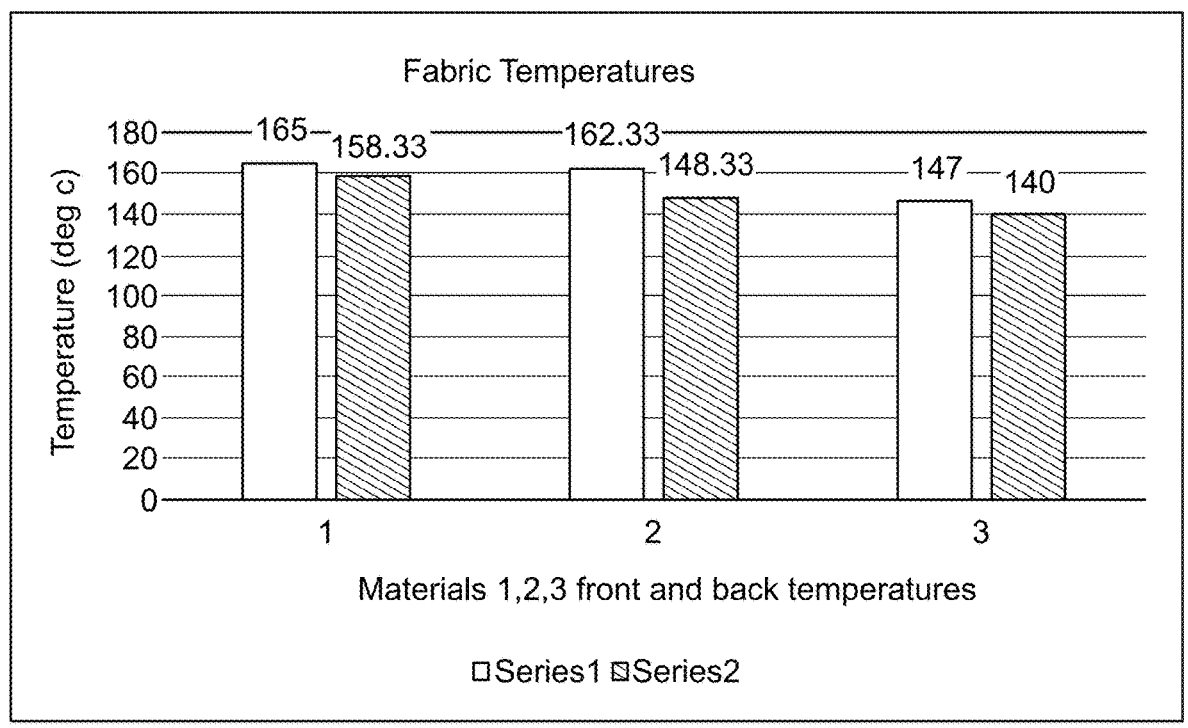

This Example compares the three materials tested in Example 8 in a heat transfer through the thickness of the fabric test. The experimental setup is shown in FIGS. 21A-C. FIG. 21A shows a schematic of test setup, while FIG. 21B shows the actual experimental setup. A thermocouple is used to measure the temperature of the point of heating on the front side, and directly behind the point of heating on back side. Room temperature was 25.6° C. Measurements are given in Table 13.

TABLE 13

Thermal Conductivity Through the Fabric Thickness

| Point | Front | Back |
|---|---|---|
| Material 1-Quantum 4i | 167.8 | 159.4 |
|  | 162.7 | 156.5 |
|  | 164.2 | 158.9 |
| Average | 165 | 158.33 |
| Material 2-Glide w/ PBI G2 | 163.1 | 145.9 |
|  | 162.9 | 150.2 |
|  | 161.2 | 148.6 |
| Average | 162.33 | 148.33 |
| CNT Sheet | 148.1 | 141.1 |
|  | 145.9 | 140.9 |
|  | 146.5 | 138.7 |
| Average | 147 | 140 |

Fabric temperatures for through the thickness testing are shown in FIG. 21C.

The CNT sample has lower temperatures likely indicating faster spreading of heat due to greater thermal conduction or greater convection cooling of the sample. The heat input to each sample is nominally the same. This behavior agrees with burn through testing where CNT fabric withstood a direct flame longer than conventional firefighter fabrics because the CNT fabric spreads heat instead of concentrating the heat due to low thermal conduction of standard firefighting fabrics. The three fabrics did not show a large difference in temperatures. Fabrication of the prototype glove and the heat transfer testing performed suggests that thin, flexible, veil-like CNT fabric can improve the properties of garments without adding significant bulk or mass to the garment.

The invention claimed is:

1. A method of manufacturing a yarn or fabric comprising a carbon nanotube hybrid (CNTH) material, the method comprising:
    manufacturing a carbon nanotube sock via gas phase assembly in a pyrolytic reactor;
    incorporating at least one particle selected from a metallic particle, a ceramic particle, a polymeric particle, and combinations thereof, said incorporating comprising integrating the particle into the sock during growth of the sock in the reactor; and
    processing the sock into a CNTH fiber or sheet by winding or rolling, respectively.

2. The method according to claim 1, further comprising heat-treating the CNTH fiber or sheet to remove residual hydrocarbons.

3. The method according to claim 1, further comprising rolling the CNTH sheet under pressure.

4. The method according to claim 1 further comprising layering the CNTH fiber or sheet on or between layers of fabric comprising fiber selected from natural fiber, synthetic fiber, and combinations thereof.

5. The method according to claim 4, wherein layering comprises bonding the CNTH sheet to at least one layer of fabric using application of pressure, application of heat, stitching, or combinations thereof.

6. The method according to claim 4, wherein the synthetic fiber comprises at least one aramid fiber.

7. The method according to claim 1 further comprising feeding a material into the pyrolytic reactor during the gas phase assembly such that a CNTH material is deposited directly onto the material, said material comprising a high modulus polyethylene fiber or sheet.

8. The method according to claim 1, wherein the at least one particle comprises one or more of copper and granulated activated carbon (GAC).

9. The method according to claim 1, wherein the at least one particle is incorporated into the carbon nanotube sock by injection into the pyrolytic reactor during gas phase pyrolysis.

* * * * *